US006298481B1

United States Patent
Kosaka et al.

(10) Patent No.: US 6,298,481 B1
(45) Date of Patent: Oct. 2, 2001

(54) SYSTEM FOR MODIFYING THE FUNCTIONALITY OF COMPILED COMPUTER CODE AT RUN-TIME

(75) Inventors: Takashi Kosaka, San Carlos; Michael Plate, Fremont, both of CA (US)

(73) Assignee: Segasoft, Inc., Redwood City, CA (US)

( * ) Notice: Subject to any disclaimer, the term of this patent is extended or adjusted under 35 U.S.C. 154(b) by 0 days.

(21) Appl. No.: 09/183,797

(22) Filed: Oct. 30, 1998

(51) Int. Cl.[7] .................................................. G06F 9/45
(52) U.S. Cl. ........................................... 717/11; 717/1
(58) Field of Search .................... 717/11, 1; 707/200, 707/203

(56) References Cited

U.S. PATENT DOCUMENTS

| | | | |
|---|---|---|---|
| 4,742,467 | * 5/1988 | Messerich et al. | 364/200 |
| 5,237,680 | * 8/1993 | Adams et al. | 395/600 |
| 5,247,651 | * 9/1993 | Clarisse | 395/500 |
| 5,553,286 | * 9/1996 | Lee | 395/650 |
| 5,613,111 | * 3/1997 | Malatesta et al. | 395/602 |
| 5,881,292 | * 3/1999 | Sigal et al. | 717/11 |
| 5,953,534 | * 9/1999 | Romer et al. | 717/11 |

OTHER PUBLICATIONS

Aho et al. Compilers: Principles, Techniques, and Tools. Addison–Wesley Publishing Company, pp. 60–62, 429–440, Mar. 1988.*

* cited by examiner

Primary Examiner—Mark R. Powell
Assistant Examiner—Wei Zhen
(74) Attorney, Agent, or Firm—Charles J. Kulas; Townsend and Townsend and Crew, LLP

(57) ABSTRACT

A system whereby a computer program can be transformed so that one or more of the program's symbolic references are made suitable for redirection. Once provided with redirectable symbols, the functionality of the program is easily changed at a later time, such as at start-up time or at run-time. A first phase converts a pre-existing computer program so that symbols can be re-directed. This first phase also generates auxiliary files for use in a later phase. A second phase is where the converted computer program is loaded into, and executed upon, a user's computer. A third phase is where the original computer program functionality is modified. The modification occurs at a high-level and can be performed easily by someone who was not involved in the programming of the original program. Modifications are simplified to the extent that even non-programmers can change the functionality of the computer program. This third phase uses the auxiliary file generated in the first phase. A fourth phase is where the modified functionality is loaded into an end-user's computer and is executed in conjunction with the converted program. Other features of the invention include the use of a table to facilitate symbol redirection and automatic identification of symbols and generation of auxiliary files and intermediary files to accomplish compilation steps necessary for program and add-on module builds.

33 Claims, 12 Drawing Sheets

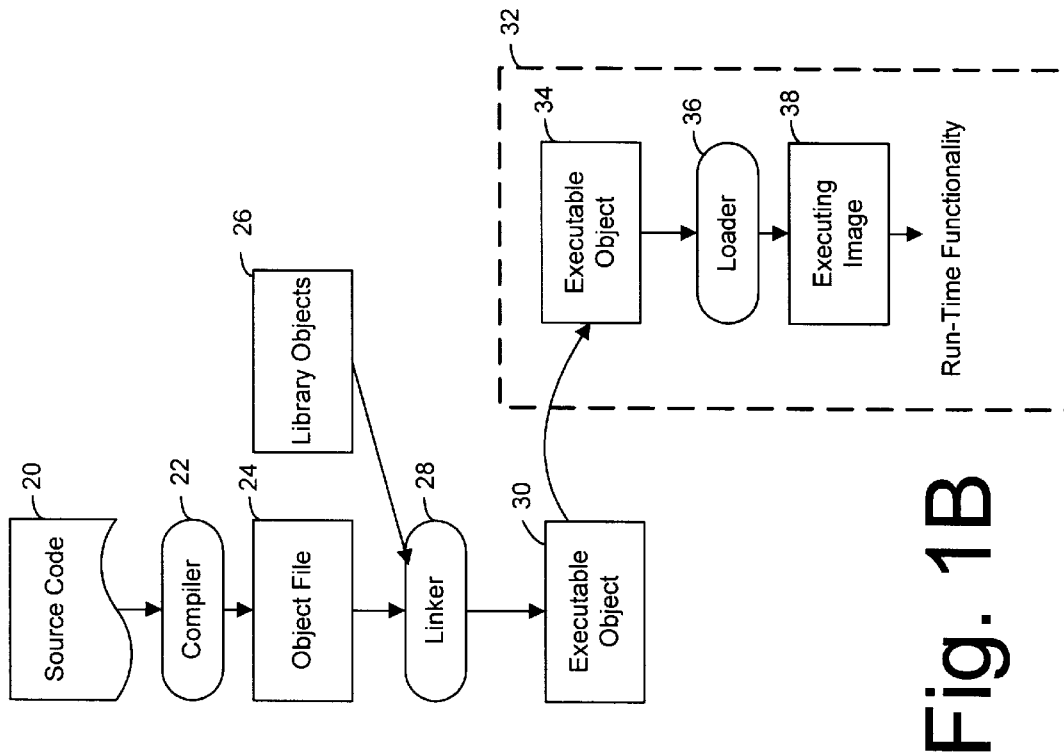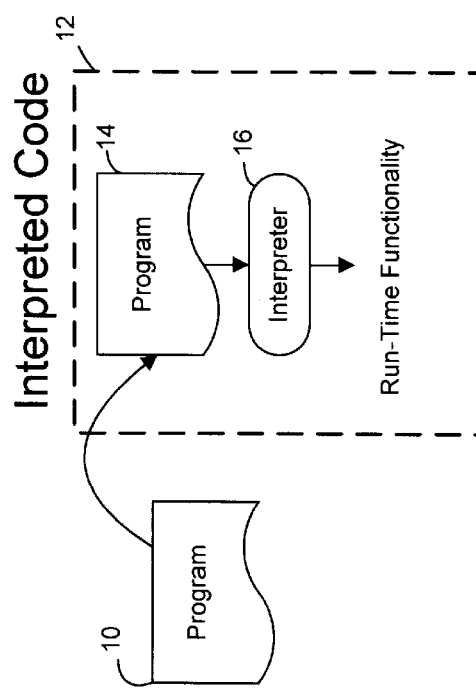
Fig. 1B
Fig. 1A

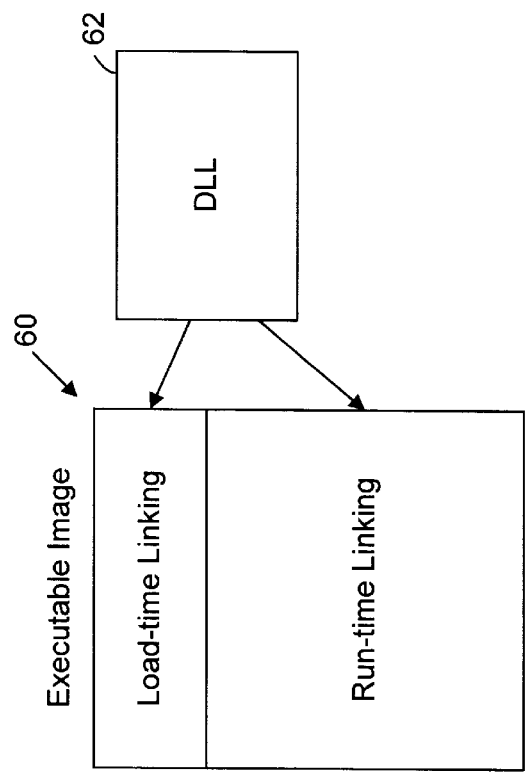
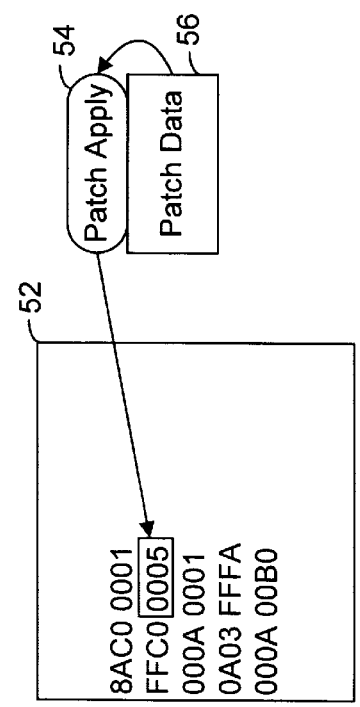

---------- Script File ----------------------------------------
This file represents to talk Dynaplay Server via Internet.

; #########################################
; #          This is selfandheat.dll Ship File
; #   Created by Dynagen.exe    Date: Wed May 20 16:46:58 1998
; #########################################
/app:net fighter.exe
/dynamodule:C:\Program Files\Net
Fighter\DynaModules\SelfAndHeat\DynaRelease\selfandheat.dll | selfandheat/selfandheat.dll
/initscname:selfandheat.dll
/initsc: (begin\
(define (http-send-data data) \
  (let-values ( [ (in out) (tcp-connect "auriga.segasoft.com" 80) ] ) \
    (let ((cont #t)) \
      (fprintf out "Post /cgi-bin/send-data-dynamodule3 HTTP/1.0 ~% "
      (fprintf out "Content-type: text~%"
      (fprintf out "Content-length: ~a~%~%" (string-length data)) \
      (fprintf out "~a" data) \
      (do ((data (read in) (read in))) \
          ((or (eof-object? data) \
               (not cont))) \
        (if (string? data) \
            (begin (load-from-port in) \
                   (set! cont #f)))) \
      (close-input-port in) \
      (close-output-port out) \
      ))) \
650 {
  (enable-dynamod "selfandheat/selfandheat.dll" "net fighter.exe" \
   ' ((84 . #x1000) (184 . #x2b80) (103 . #x3ab0) (107 . #x3d10) (109 . #x48e0) \
     (115 . #x5280) (145 . #x69e0) (146 . #x6a50) (147 . #x6b90) (148 . #x7280) \
     (149 . #x7310) (150 . #x7350) (151 . #x78e0) (152 . #x7e40) (153 . #x8370) \
     (154 . #x85e0) (155 . #x86d0) (156 . #x94a0) (216 . #x9a70) )) \
  (thread (lambda () \
    (let loop () \
      (sleep 10) \
      (if (defined? 'user) \
     (if (not (number? user)) \
     (http-send-data user)) \
     (if (not (defined? 'SelfPlay-RUN)) \
        (loop)))))))

Arrows labeled 652 and 654 point to the (enable-dynamod line.

Fig. 8

SYSTEM FOR MODIFYING THE FUNCTIONALITY OF COMPILED COMPUTER CODE AT RUN-TIME

COPYRIGHT NOTICE

A portion of the disclosure recited in the specification contains material which is subject to copyright protetion. Specifically, a Microfiche Appendix in accordance with 37 CFR Section 1.96 is included that lists source code instructions for a process by which the present invention is practiced in a computer system. The Microfiche Appendix comprises 1 sheet of microfiche containing 63 frames, or pages, of source code appendix. The copyright owner has no objection to the facsimile reproduction of the specification as filed in the Patent and Trademark Office. Otherwise all copyright rights are reserved.

BACKGROUND OF THE INVENTION

This invention relates in general to the execution of computer programs and more specifically to a system which allows the run-time functionality of a compiled computer program to be modified.

Computer programs, or code, can be executed in a number of different ways. Two broad, and fundamentally different, ways are by executing interpreted code or by executing compiled code.

Interpreted code generally requires the processor to operate on a line-by-line basis on human-readable code. That is, the representation of the computer program is in a text-based form, or not far removed from a text-based form such as where the code is "tokenized," so that the difference between the code as written by a human programmer, and as executed by the processor are quite similar. Interpreted code unlike compiled code, has the advantage of not requiring long "build" times. Essentially a programmer can write interpreted code and execute the code immediately for the purposes of testing the code. In this respect, interpreted code is useful for rapid prototyping. Interpreted code is generally well-suited to small applications where speed is not a major issue. This is because a big drawback of interpreted code is that it is notoriously slow compared to compiled code.

Compiled code produces very fast executable programs. However, the creation and maintenance of compiled code is much more involved than with interpreted code. Also, the programs produced with the compiled program approach are more complex to develop and modify. Typically, many program modules are required which must be compiled, linked and loaded before a change can be tested or before a deliverable executable is produced. There can be hundreds of different modules, or files, in large compiled computer programs, sometimes referred to as "projects." The build process for these projects is complicated in itself, requiring precise coordination of symbols, processes, resources and other aspects of developing the program. A complete build of a computer program can take hours of time, depending on the size of the program. Moreover, compiled code development requires precise archiving, bookeeping and tracking of modules, utilities, tools and other developer support software. As a computer program ages it may be difficult, or impossible, to re-build a specific version of a program even though the executable version of the program is still in use. This is because the operating system, development environment, tools, utilities or other software (or hardware) used to build the program may have changed.

Since a programmer must have detailed knowledge of the compiled program and the development environment it is difficult for programmers who are not the original programmers of a compiled program project to "come up to speed" and make modifications to software written by another programmer. The compiled, linked and loaded executable code is not readable by a human programmer in any practical sense, forcing the programmer to learn not only the human-readable "source" code version of the program, but to also have a detailed working knowledge of the build process for the program. Thus, the maintenance and modification of compiled code poses problems.

Another property of both interpreted and compiled code is that it is difficult to change the run-time functionality, or behavior, of the code. In the interpreted code approach, an entire new set of interpreted code instructions must be loaded onto a user's computer. Compiled code is typically so much larger than interpreted code that approaches, discussed below, have been developed to circumvent the loading of a completely new version of the compiled executable. Although interpreted code is relatively small, thus permitting new versions to be loaded easily, it is not suitable for the majority of application programs which require fast execution of very large programs. Examples of interpreted code are BASIC, Lisp and script languages such as Perl and Java. Examples of laguages used in compiled code approaches are Fortran, "C," assembly language, etc. However, these categories are somewhat loosely defined since any computer language can be implemented as a compiled code or interpreted code approach assuming an appropriate "interpreter" or "compiler" is written for the target machine intended to execute the code.

The prior art is discussed below with reference to FIGS. 1A–F.

FIG. 1A shows a simplified diagram illustrating the process for executing interpreted code.

In FIG. 1A, program 10 is created by a programmer. Typically this is done in a word-processing program which results in human-readable text. The program is loaded into a user computer 12. The transfer, or loading, can be by diskette, compact disk read-only memory (CDROM), downloading from a network, or by other means. The loaded program 14 is usually an exact copy of the original text produced by the programmer. Loaded program 14 is interpreted by interpreter 16 which results in the execution of functions as specified by the program code, or script, to produce the desired run-time functionality in the user's computer. Thus, there is only a single program definition in an interpreted code approach. That of program 10 which serves as the human-readable definition of the program and as the executing image in the user's computer.

FIG. 1B shows a simplified diagram illustrating the process for executing compiled code.

In FIG. 1B, items 20–30 are part of a software "build" process whereby an machine-readable executable object is created from human-readable source code modules. Items 34–38 illustrate items involved with executing a compiled software program on a user's computer 32.

In FIG. 1B, source code 20 is created by a programmer and is the human-readable version of the program. Typically, programmers in compiled code development environments work with separate files of source code so, for example, source code 20 of FIG. 1B represents a single module of many modules used in the program project. A module can have from a few to several hundred or more lines of code. Source code 20 is compiled by compiler 22 to result in an object file 24. Each module is capable of being compiled independently of any other modules in the program project.

This allows sections of the program to be modified on a module-by-module basis without requiring compilation of all of the many modules in the program project. However, note that changing even a single line in a module requires that the entire module be re-compiled and the entire project re-built as discussed below.

Once compiled, the object file can be linked to other object files in the program project. The other object files can be from other compiled source code modules that the programmer, or another programmer, has written. Other sources for linkable object modules include pre-existing library objects 26 to provide commonly needed functions. All of the object files for the program project are linked via linker 28 to produce a single executable object 30. Producing executable object 30 culminates the program build. Note that, generally (aside from dynamic linking discussed below) it is necessary to have all of the object files from all of the modules, libraries and other object file sources on hand to do a build. This is problematic on large projects because different objects may be changing at different times as a result of different programmers' actions. When it is desired to change the functionality of a compiled program at a later time, by re-building the program, for example, it is necessary to have a set of object files that are compatible with each other. Essentially this means that all "symbol" references among the object files must agree. Symbols are merely text labels that refer to different objects or items in the source code such as processes, routines, subroutines, functions and data structures. Because the build process is so complex, programmer's "developer's environments" are provided by software development "tool" manufacturers that assist in coordinating modules, object files, symbol references and performing other related development tasks.

Returning to FIG. 1B, the result of linking object files is executable object 30. Executable object 30 represents the deliverable product which is then transferred to the target, or user's, computer 32 for execution. Typically, executable object 30 is loaded by loader 32 which places the executable object into system random access memory (RAM) to produce an executable image 34. As with the interpreted code case, the executable object can be transferred on any computer-readable media, transferred over a communication link such as the Internet, or stored in the user's computer by other means. Executable image 34 is accessed by the processor in the user's computer to execute the compiled instructions to provide functionality according to the original source code instructions.

Note that execution of compiled code requires several steps and many different files and transformations of the original source code instructions. This is in contrast with execution of interpreted code. The complexity of preparing and handling compiled code is necessary to achieve maximum speed and efficiency desired by many of today's computer applications.

However, a problem exists with both the interpreted and compiled program approaches in that it is difficult to modify the functionality of these programs at run-time. That is, at the time when the user is executing the program it is difficult, or impossible, for a developer, manufacturer, or other provider of the original program to modify the functionality of the programs provided to the user. In order to fully illustrate this more details of both the interpreted code and compiled code approaches are presented.

FIG. 1C shows an example of a small portion of interpreted source code. In FIG. 1C, a portion of a Java-type of code is shown. An example of this is the JavaScript language described in detail in such references as "JavaScript, The Definitive Guide," by David Flanagan, published by O'Reilly & Associates, Inc., 1997. FIG. 1A shows the JavaScript as it would appear resident in the user's computer system such as in loaded program 10 of FIG. 1A. Although the JavaScript is written in a specialized syntax, it uses standard alphanumeric English characters and is human-readable. Thus, a person of skill in the art can immediately look at the three lines of script resident on a user's computer and determine that these lines instruct the computer to print out the numbers from one to ten with a space between each number.

In order to modify the functionality of this code as, for example, to print out the numbers from one to twenty, an entire new source code module, or document, would have to be obtained and substituted for the source code module containing the lines shown in FIG. 1C. Typically, this is not a problem where the source code modules arc very small in size. For example, Java-type languages are very popular on the Internet where they are used embedded within, or loaded in connection with, World Wide Web pages. Since the Java "applets" tend to be very small, a new version of the applet is provided each time a user access (i.e., loads) a page of information. In this manner, changes to the source code are always available in the version that the user is executing.

However, as mentioned above, interpreted source code has the major drawback of vere slow execution (compared to compiled code). Also, large programs are not written in interpreted code because the human-readable format is not space-efficient.

FIG. 1D shows an example of what a compiled executable object portion would look like. The executable object is merely a series of numbers, represented in FIG. 1D as hexadecimal numbers. Typically these numbers are not even viewable as readable numbers unless special viewing programs arc used. The numbers represent machine-level instructions that the central processing unit (CPU) in the user's computer system executes directly rather than the indirect, interpreted, approach.

For example, in the interpreted code instruction of FIG. 1C, a line-by-line interpretation may take place. The computer reads in a line of script, parses the line, and converts the line into a series of machine instructions and executes the instructions. In some cases the conversion results in numbers similar to those that would result had the interpreted code been compiled, instead. However, in many cases the interpreted code is not as fast or compact, even considering just executing a single line of the interpreted code. Naturally the reading, parsing, converting and executing of the interpreted line require the processor to execute many extra "overhead" steps to accomplish the ultimate execution of only a few machine instructions that actually perform the functionality intended by the programmer. The executable object of the compiled program approach, on the other hand, is already in machine readable form and contains just the instructions to implement the functionality desired by the programmer. Thus, the computer can directly load each machine instruction into its processor and execute the instruction without suffering the run-time execution overhead of the interpreted code approach. The use of compiled code is absolutely necessary to take full advantage of a processor's speed, and the computer's limited memory and disk space.

As can be seen from the executable object code portion in FIG. 1D, the numbers occupy contiguous locations in memory. This makes it difficult to perform a modification that adds instructions or data to the executable. Again, in order to properly change the functionality of the executable object resident in the user's computer a new, or modified, executable object would have to be produced and provided to the end-user. Although this can be done by downloading over a communication link, such as the Internet, the large size of today's executable objects requires several hours of download time and makes it impractical and undesirable to make changes to the run-time functionality of compiled executable objects.

The software industry has developed two basic approaches to changing the functionality of compiled executable objects at run-time. These are (1) "patching" existing executable objects or (2) using dynamically linked libraries (DLLs).

FIG. 1E shows an example of patching a compiled executable object.

In FIG. 1E, executable object 52 can be modified by patch apply code 54 which uses patch data 56. In this approach, an instruction or value, such as the value 000A which represents a 16-bit word can be modified to a different value such as 0005 by executing instructions in patch apply code 54 which obtain the new value 0005 from patch data 56 and insert the data into the proper location in executable object 52. In this example, a portion of code shown in FIG. 1D would have, as a result of applying the patch, the code shown in executable object 52.

Where executable object 52 may be on the order of tens of megabytes in size, the patch apply code 54 and patch data 56 (collectively the "patch") may be on the order of thousands of bytes. The patch typically constructs a new executable object by using data in the previous executable object (i.e., the executable object of FIG. 1D) making the changes and saving the new executable object (the executable object 52 in FIG. 1E) as a replacement to the prior executable object. Naturally, the types of patching that can occur include deleting portions of the old executable object, adding new portions to the old executable object and modifying existing portions of the old executable object.

Patching is more efficient than downloading an entire new version of a large compiled executable object since the patch apply code and patch data are much smaller than the executable object. However, patching only provides a one-time change to a program's functionality. Also, the change in functionality takes place before the program is executed. In this respect, the patching approach does not provide run-time modification of the functionality of the computer code. Also, the process of downloading a patch and applying the patch to create a new executable object is time-consuming and is not transparent to the user who must often participate in the patching process by giving authorization to go ahead with the patch, designating which directory the patched executable object will reside in, etc. Patches can cause problems where multiple patches exist for a program and the patches are not applied by a user in the proper order. Also, patches cause an annoying delay in a user's execution of a program since the patch must be obtained and executed—a sometimes time-consuming process—before the patched program can begin execution.

The second approach, that of using DLLs, does allow a degree of run-time modification of functionality. However, this approach is limited and lacks desired flexibility as described below.

FIG. 1F illustrates the use of a DLL.

In FIG. 1F, executable image 60 links to routines, functions, and other items in DLL 62 just prior to, and during, run-time. The process of linking to a DLL is similar in concept to the process performed by linker 28 of FIG. 1B during a program build, discussed briefly above. To understand dynamic linking to a DLL, linking during a program build is first discussed.

As mentioned, modules are handled as separate entities during program development. The modules' information must be combined to create a single executable program during the program build. The major task in combining modules is to resolve symbolic references to items such as processes, routines, subroutines, functions, objects, data structures and other resources (collectively referred to as "items") that may be defined in other modules. Symbolic references, or symbols, are merely the alphanumeric human-readable names that a programmer uses during writing of the source code. These symbols are later mapped into addresses to generate the machine-readable code. In order to map symbols to addresses the symbol must be associated with the definition of a corresponding item.

Some item definitions will not reside in a given module that needs to access the item. In this case, the given module "declares" that the item is external to the module. The compiler can then ignore references to the externally defined item so that the given module can be compiled (and checked for internal errors) without needing to include other modules in the compile. Later, when the modules have been fixed with respect to the errors that the compiler detects, the given module is "linked" with the module that actually has the item definition. The linker can provide detailed information on a symbol name, such as where the symbol is used, where the symbol is defined, the relative address that the symbol maps to, etc. Large computer programs may use thousands, or tens of thousands or more, symbolic references. Since each programmer typically makes up their own symbol names, memorization and understanding of the symbol names is usually a major hurdle to be jumped if another programmer is to understand the program sufficiently to modify the program. As mentioned, symbols are defined in one module and may be used by another, or many other, modules by having the other modules declare the symbol as external to the module. There are several other types of mechanisms for handling symbolic references. These mechanisms vary according to particular computer languages. However, each computer language, assuming it is a compiled language, ultimately needs to resolve symbol definitions and symbol use among multiple source code modules (or other source code entities) by using a process like a linker. Since symbol resolution is so massive, and so pervasive throughout the program project, it is mandatory that a major change to a compiled computer program take place by modifying, adding to, or deleting from, source code modules and that a subsequent re-build of the entire program take place to create a new version. As mentioned before, builds take considerable time and require accurate archiving, bookeeping and tracking of various modules, tools, utilities and additional information.

Dynamic linking allows linking to occur at startup time or during run-time execution of the program. The basic method of a DLL is to declare certain symbols as "exported" or "imported" symbols to be resolved at execution time. The code that resolves the symbols (i.e., associates each symbol reference to a symbol definition) is "DLL linking" code which is, itself, linked into the program during the program build and becomes part of executing image 60. At run-time the DLL linking code is executed to provide the executing program with access to items contained in the DLL.

Typically, DLL 62 includes many functions, routines, data structures, or other items that can be referenced by instructions within executing image. The use of a DLL provides a way to modify the functionality of an executable image just prior to, or during, run-time by changing the functions in the DLL prior to executing the executable image. For example, a DLL may contain a graphics library such as Microsoft's DirectX library. If the graphics routines are changed the user can update their DLL by obtaining the new DLL (e.g. from a CD ROM, downloading from the Internet, etc.) and execute the same executable image which will then make use of the new functionality provided by the updated DLL.

While the use of DLLs in this manner has advantages, there are also drawbacks. One drawback is that the entire DLL is loaded whenever any one item within the DLL needs to be referenced by an instruction in the executable image. The requirement for handling items within DLLs as a group is inefficient where only a small percentage of the items in the DLL are updated. That is, the user must obtain an entirely new DLL which contains only a small amount of changed code.

A second drawback with DLLs is that they require specific preparation in the application program that results in an executable image that can make use of DLLs. Referring to FIG. 1B, this preparation takes place at the outset when a programmer is writing the source code, such as source code 20. Typically, the programmer must declare DLL item references in various portions of the code. Specific support files must also be linked by linker 28 in order to resolve references to DLL items that will be actually linked at a later time. There are additional preparations that need to be made in order to correctly implement a DLL that vary among operating systems. Much of the details of DLL use are created by a programmer and, in this respect, a later programmer needs to learn the details. In general, the DLL approach is still a "library" based approach that doesn't work well for small, selective, functional changes. For discussions on preparing applications programs for use with DLLs, references describing operating systems such as Microsoft's Windows 95, Sun Micro Systems, and Sun OS should be consulted.

Thus, it is apparent that a system for providing modification of run-time functionality that overcomes the problems of the prior art is desirable. Such systems should allow transparent and efficient modification of functionality prior to, or during, run-time without requiring a user to update large files such as DLLs. Such a system should also allow general application programs to be modified without requiring intricate preparation or large overhead by programmers or other developers. Ideally, the system would allow persons not involved with the Program Conversion of the application to quickly and accurately modify the functionality of the application program. The system should provide efficient execution of instructions that modify the functionality of an executing image while not requiring large amounts of system RAM to accommodate the added, or changed, functionality. The system should provide the simplicity and flexibility of interpretive code while maintaining compactness and speed of execution provided by compiled code.

SUMMARY OF THE INVENTION

The present invention provides a system whereby a computer program can be transformed so that one or more of the program's symbolic references are made suitable for redirection. Once provided with redirectable symbols, the functionality of the program is easily changed at a later time, such as at start-up time or at run-time.

Different aspects of the invention are encompassed in a four-phase description of the invention. A first phase converts a pre-existing computer program so that symbols can be re-directed. This first phase also generates auxiliary files for use in a later phase. A second phase is where the converted computer program is loaded into, and executed upon, a user's computer. A third phase is where the original computer program functionality is modified. The modification occurs at a high-level and can be performed easily by someone who was not involved in the programming of the original program. Modifications are simplified to the extent that even non-programmers can change the functionality of the computer program. This third phase uses the auxiliary file generated in the first phase. A fourth phase is where the modified functionality is loaded into an end-user's computer and is executed in conjunction with the converted program.

Details of the invention provide for a set of tools, utility routines and steps comprising a Software Developer's Toolkit to implement the invention under the Microsoft Developer's Environment.

In the first phase, symbol tables are used to identify symbols that are suitable for equipping with redirection ability. Potentially every symbol in a program is susceptible for re-direction, as desired. Symbol names referencing computer program instruction, data or other items can all be prepared for redirection. A default method of the first phase provides an executable object version of the original program that behaves in an identical manner with the original program. The symbols are mapped through a table to achieve the desired added level of indirection, thus providing re-directability.

In the second phase, an executable image obtained from the converted program of the first phase is executed in a user's computer. The behavior of the executable image in the second phase is identical with the functionality of the program as defined by the original (unconverted) source code. In actuality, the converted executable object will be slightly larger, and may execute slightly more slowly than the original version but usually these effects will be negligible.

In the third phase, information obtained from the first phase is used to allow symbols to be redirected. Thus, for example, a data image can be substituted for a former image, a new subroutine or function can be inserted into the execution of the program, instructions within an original subroutine can be edited, etc. The third phase produces a file or set of files that can be downloaded onto the user's computer to reside in memory with the executable object of phase 2. These files are referred to as "add-on" modules.

In the fourth phase, the functionality provided by the add-on modules is incorporated into the executable image either at startup time or during run-time. One aspect of the invention provides a scripting language to control the manner in which symbol redirections and, hence, functionality is modified. Other aspects of the invention implicate details of each of the specific phases set forth, above, including the use of a table to facilitate symbol redirection, and automatic identification of symbols and generation of auxiliary files and intermediary files to accomplish compilation steps necessary for program and add-on module builds.

A method for converting a computer program into an executable object having symbol references that can be redirected at run-time, the method executing on a computer system, the computer system including a processor and storage device, the computer system further including an original computer program having symbolic references to original definitions, the method comprising the steps of executing a process to scan the computer program for symbolic references; defining a substitute reference for one or more symbolic references; creating a link between one or more symbolic references and a corresponding substitute reference; and creating a link between a substitute reference and an original definition in the computer program.

BRIEF DESCRIPTION OF THE DRAWINGS

FIG. 1A shows a simplified diagram illustrating a prior art process for executing interpreted code;

FIG. 1B shows a simplified diagram illustrating a prior art process for executing compiled code;

FIG. 1C shows an example of a small portion of interpreted source code;

FIG. 1D shows an example of a compiled executable object portion;

FIG. 1E shows an example of patching a compiled executable object;

FIG. 1F illustrates the use of a DLL;

FIG. 8 is an example of control script.

DESCRIPTION OF THE SPECIFIC EMBODIMENTS

The present invention is discussed in sections as follows: The first section describes basic hardware, such as a computer, subsystems and network, suitable for use with the present invention. The second section provides an overview of the invention. The third section illustrates a specific set of tools, utility routines and other programs for preparing an initial program for run-time modification ability. A fourth section describes the process of creating add-on modules which provide modified functionality at run-time. A fifth section describes methods, including the use of a script language, to alter references to items at startup or run-time. A sixth section discusses miscellaneous details and features of the invention.

1. Description of Hardware

Figure 2A:
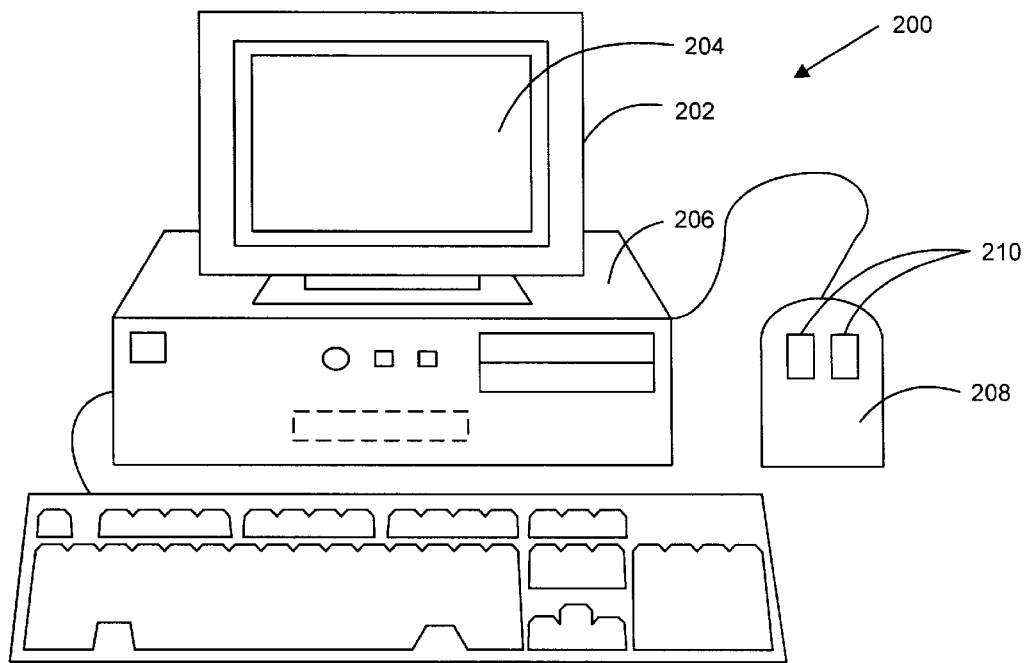
FIG. 2A is an illustration of a computer system suitable for use with the present invention.
Figure 2B:
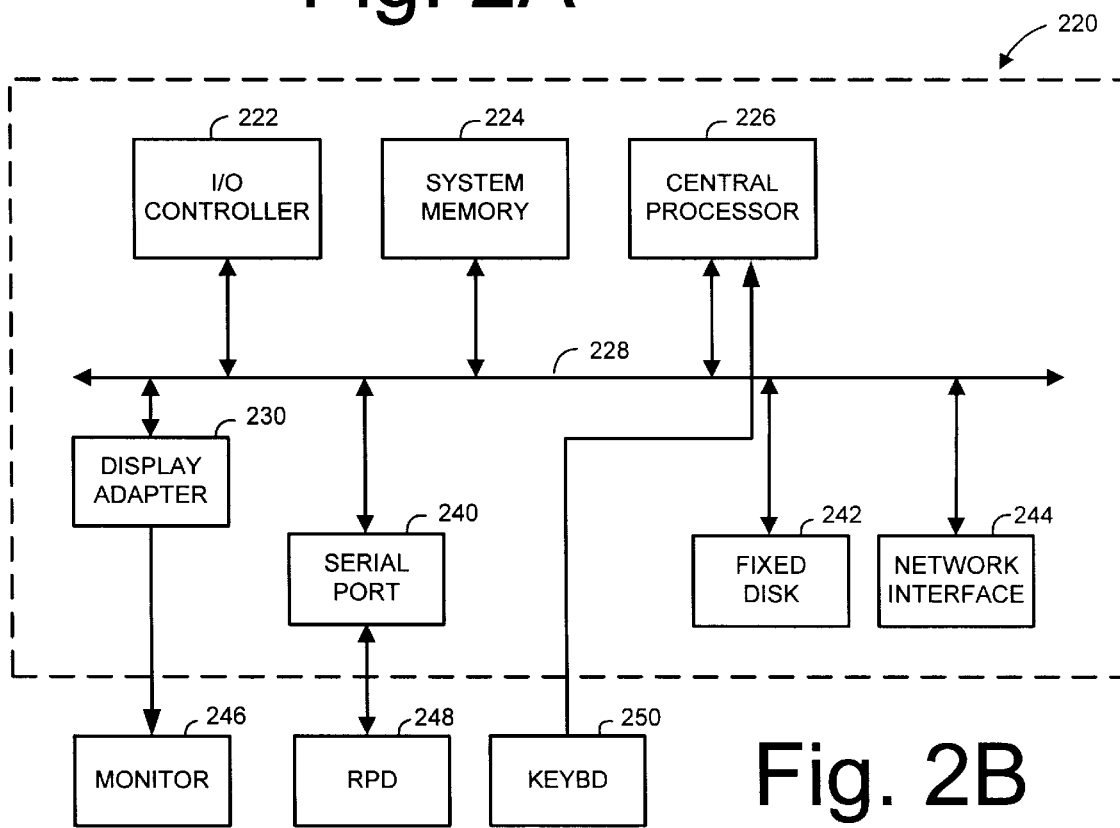
FIG. 2B shows subsystems in a computer system such as the computer system of FIG. 2A.
Figure 2C:
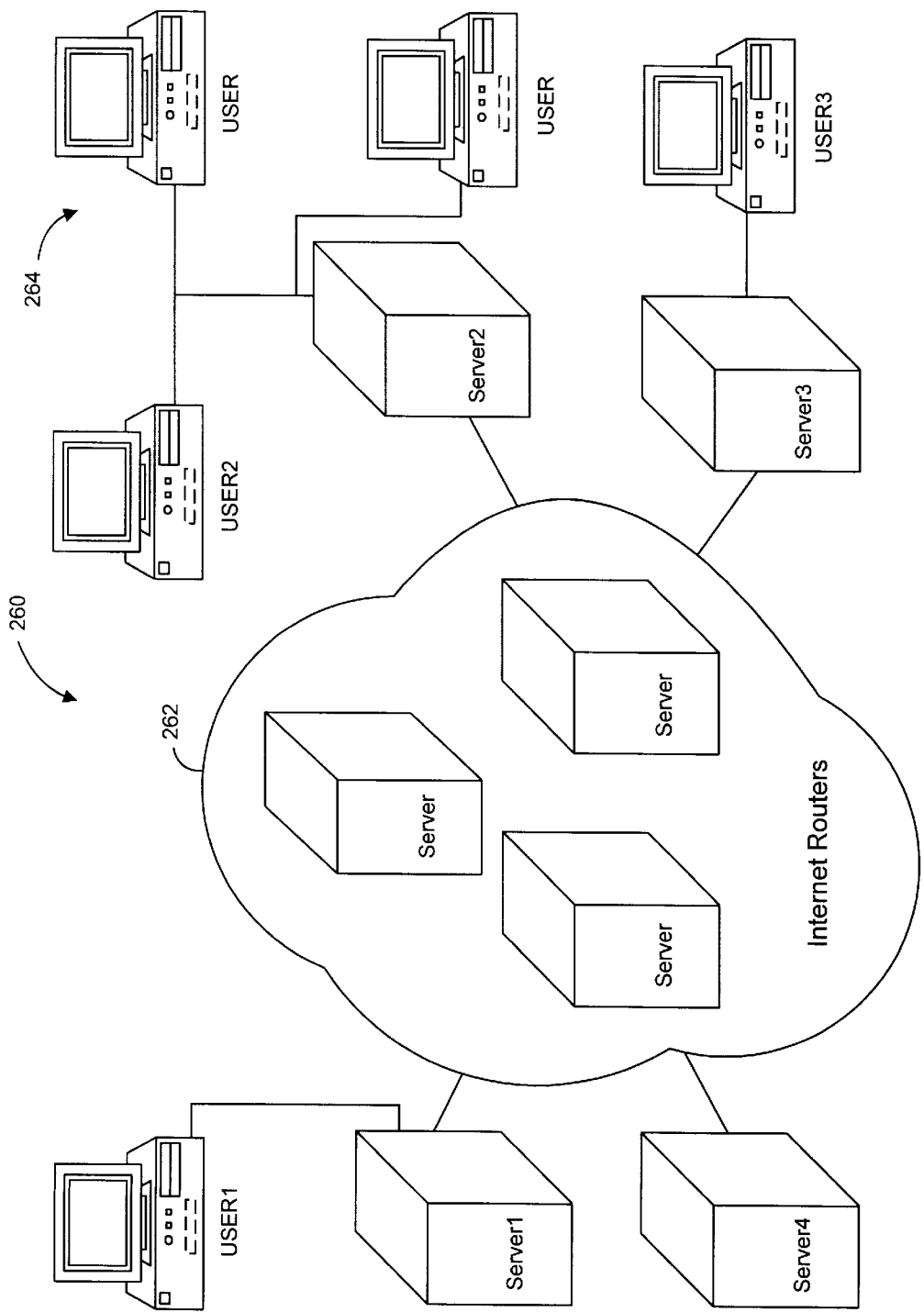
FIG. 2C is a generalized diagram of typical networks.

FIGS. 2A–C illustrate basic hardware components suitable for practicing the present invention.

FIG. 2A is an illustration of computer system 200 including display 202 having display screen 204. Cabinet 206 houses standard computer components (not shown) such as a disk drive, CDROM drive, display adapter, network card, random access memory (RAM), central processing unit (CPU), and other components, subsystems and devices. User input devices such as mouse 208 having buttons 210, and keyboard 212 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, mainframe). Any platform suitable for performing the processing described herein is suitable for use with the present invention.

FIG. 2B illustrates subsystems that might typically be found in a computer such as computer 200.

In FIG. 2B, subsystems within box 220 are directly interfaced to internal bus 228. Such subsystems typically are contained within the computer system such as within cabinet 206 of FIG. 2A. Subsystems include I/O controller 222, System Memory (or "RAM") 224, CPU 226, Display Adapter 230, Serial Port 240, Fixed Disk 242, Network Interface Adapter 244. The use of bus 228 allows each of the subsystems to transfer data among subsystems and, most importantly, with the CPU. External devices can communicate with the CPU or other subsystems via bus 228 by interfacing with a subsystem on the bus. Thus, Monitor 246 connects with Display Adapter 230, a relative pointing device (e.g. a mouse) connects through Serial Port 240. Some devices such as Keyboard 250 can communicate with the CPU by direct means without using the main data bus as, for example, via an interrupt controller and associated registers.

As with the external physical configuration shown in FIG. 2A, many subsystem configurations are possible. FIG. 2B is illustrative of but one suitable configuration. Subsystems, components or devices other than those shown in FIG. 2B can be added. A suitable computer system can be achieved without using all of the subsystems shown in FIG. 2B. For example, a standalone computer need not be coupled to a network so Network Interface 244 would not be required. Other subsystems such as a CDROM drive, graphics accellerator, etc. can be included in the configuration without affecting the performance of the system of the present invention.

FIG. 2C is a generalized diagram of typical networks.

In FIG. 2C, network system 260 includes several local networks coupled to the Internet. Although specific network protocols, physical layers, topologies, and other network properties are presented herein, the present invention is suitable for use with any scheme for transferring data between computer systems. Also, the invention may be practiced on a standalone computer, one that is not connected to a network.

USER1 computer is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 262. Note that the use of the Internet for distribution or communication of information is not strictly necessary to practice the present invention but is merely used to illustrate a preferred embodiment, below. Further, the use of server computers and the designation of server and client machines is not crucial to an implmentation of the present invention. USER1 Computer can be connected directly to the Internet. Server1's connection to the Internet is typically by a relatively high bandwidth transmission medium such as a T1 or T3 line.

Similarly, other computers at 264 are shown utilizing a local network at a different location from USER1 Computer. The computers at 264 are coupled to the Internet via Server2. USER3 and Server3 represent yet a third installation.

2. Overview of the Invention

Figure 3A:
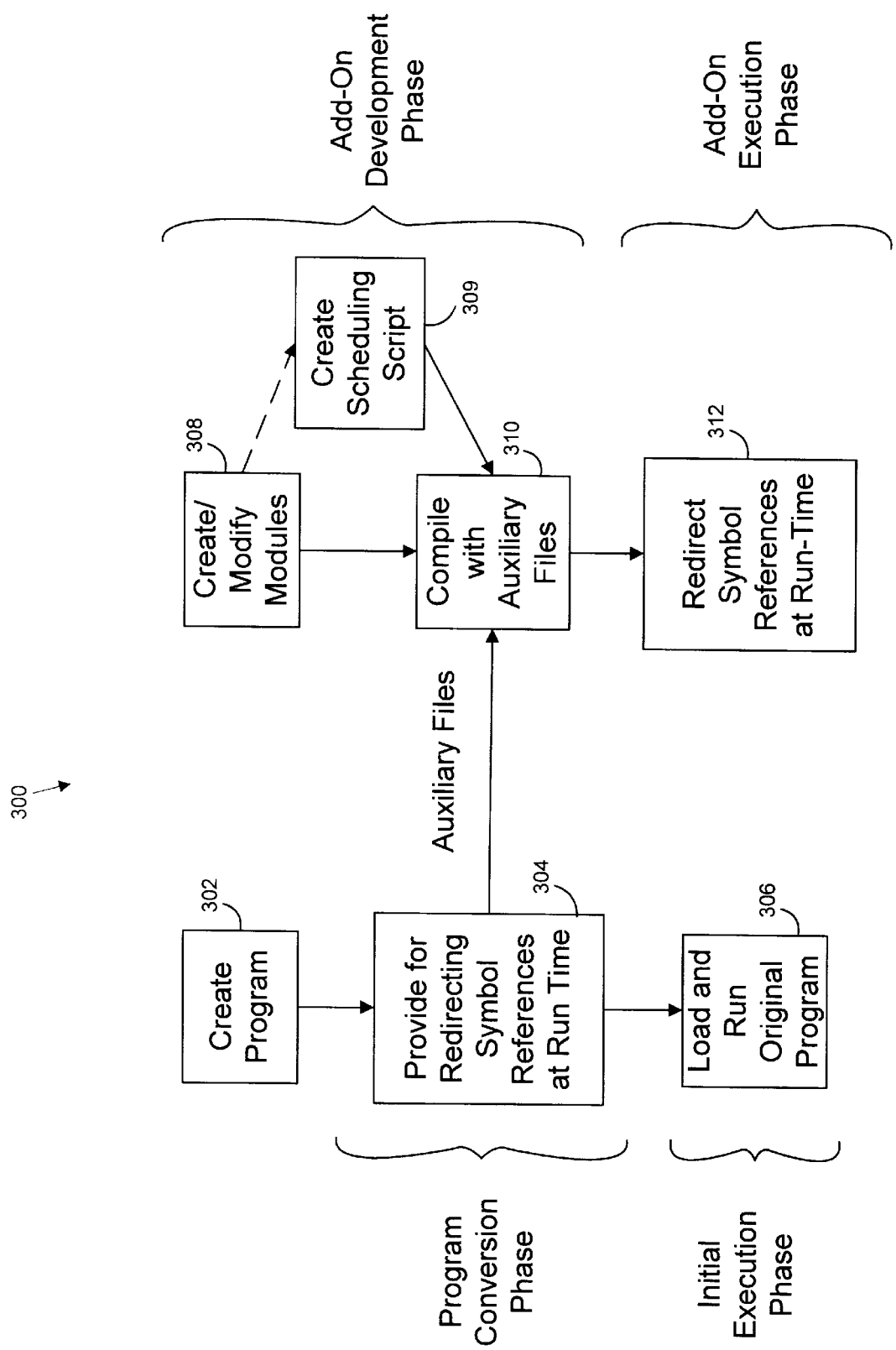
FIG. 3A shows a flowchart illustrating basic steps in the overall approach of adding functionality to a compiled program at run-time.

FIG. 3A shows flowchart 100 illustrating basic steps in the overall approach of adding functionality to a compiled program at run-time.

The system can be thought of as having four phases. The first phase is the Program Conversion Phase where a preexisting program, such as an application program, is converted and built into an initial executable object. The second phase is the Initial Execution Phase where the initial executable object is transferred to, and executed on, an end user's computer. Note that, although the program has been converted, it has not yet been supplied with modified functionality. That is, the program still executes as originally intended as defined by the original source code. The third phase is the Add-On Development Phase where modifications are made to an item in the source code and new modules are built using information from the initial build of the program. The fourth phase is the Add-On Execution Phase where the new modules are transferred to an end user's machine, "hooked" into the initial executable object and executed. In the fourth phase both startup and run-time dynamic modification are achieved by controlling the way that functionality in the new modules is accessed by the original executable object.

In FIG. 3A, substep 304 makes up the first phase of creating and running an original application program in the Program Conversion Phase. It is assumed that substep 302 has been performed, where a programmer creates a program, such as an application program, by standard methods, so that a program exists which can be converted to provide for redirected symbol references. Note that, although the preferred embodiment is desiged to convert existing programs, that a program can be created contemporaneously with providing the redirection mechanisms of the present invention in the program. At substep 304, the source code created at substep 302 is processed by software routines of the present invention to provide for redirecting one or more symbol references at run-time. In the process illustrated as substep 304 in FIG. 3A, auxiliary files are generated to aid in the later Add-On Development Phase of creating, compiling and linking new modules for modification of the program's run-time operation.

Substep 306 is next performed to load and run the program produced as a result of substep 304. Substep 306 represents the Initial Execution Phase of the invention, that of executing an initial program where the program is provided with means for efficiently redirecting its symbol references. The program loaded and run at substep 106 performs identically to a traditional program created from the source code specification developed at substep 302. As will be discussed in more detail, the present invention's manner of providing redirected symbol references at run-time causes a slight increase in the size of the executing program and may cause a slight increase in the execution time of the program. However these increases are so slight as to be negligible in almost all cases. Further, the increases are a tradeoff to the advantage of having a compiled program whose run-time functionality is almost completely modifiable.

Returning to FIG. 3A, the third phase, the Add-On Development Phase, of the present invention includes substeps 308, 309 and 310.

At substep 308, a programmer modifies part of the program code, or data, originally created at substep 302. As will be shown, an advantage of the present invention is that substep 308 can be easily performed by a different programmer than the programmer who performs substep 302. The programmer, or other person, modifying the original program does not have to have an intimate knowledge of the design, structure and implementation of the original program as is required by traditional approaches. A major benefit of the invention is that data structures, such as images, audio and video, can be very simply changed. The Add-On Development Phase substeps will often be simple enough so that no programming knowledge is required and designers, or others, can accomplish them. Although the preferred embodiment envisons that a programmer modifies the original code, it is also possible to develop new add-on code from scratch. However, starting with working portions of the original code is often the more efficient approach. At substep 308, the existing code or data structures can be modified, new code or data structures can be introduced, existing code or data structures can be disabled, etc.

After modifications are made as indicated in substep 308, substep 310 is performed to compile the modifications with the auxiliary files generated in substep 304. Substep 309 is an optional substep involving the programmer, or another person or process, specifying the manner that symbol references are to be redirected. Usually, for simple substitutions of items, substep 309 is performed automatically by a routine invoked during the compile. However, for more control over how symbol redirection occurs, the programmer may manually provide instructions by generating or modifying a script language. This is discussed in more detail, below, in Section 5.

Only the modifications need be compiled at substep 310. This is different than most prior art approaches which require the entire definitions, references and other structures in all modules to be used when any compiled version of a program is created. Substep 310 of the present invention allows a very small portion of code, data, etc. to be compiled by using auxiliary files which serve to resolve any of the (typically numerous) symbol references that are required for linking.

Substep 312 is the fourth phase of Add-On Execution of the program. This phase assumes that modifications to the run-time program, in the form of modified "new modules," containing executable instructions, data, resources, etc., have been loaded into the same computer as the initial program. Loading into the same computer ensures that execution speed will be fast. However, parts of programs, data, processes or other items can be located and executed on different networked machines. For example, an initial executable object can be running on USER1's computer (FIG. 2C) while the initial executable object is accessing new modules residing on USER2's machine.

Either at startup or during run-time, the symbol references of the original program are modified to "point" to new items provided by the new modules. The redirection of symbol references can take place just once at startup, prior to executing the program code, or can take place numerous times, dynamically, as the program code is executed by means of mechanisms such as concurrently executing script instructions, discussed below in section 5.

Thus, FIG. 3A describes a method of the present invention in broad basic steps and substeps. Note that aspects of the present invention take place both during development and during execution of a computer program. That is, substeps 302, 304, 308, 309 and 310 are generally associated with the development of a computer program. Substeps 306 and 312 are generally associated with the execution, or end-use, of a computer program by, for example, a purchaser of a retail program or an "end-user" of a licensed computer program.

The present invention provides benefits in many facets of computer program development and use. For developers of computer programs, the invention allows computer programs to be developed traditionally, without any requirement that an original programmer change their programming tools, environment, methodology, etc., to accommodate the present invention. Indeed, any compiled computer program is susceptible to the benefits of the present invention. The present invention does not even require that existing source code for a computer program be on-hand at the time when the pre-existing program is enhanced to allow for run-time modification. Because some functions of the process of the invention are performed on object code modules and compiler-generated files such as symbol tables, it is not necessary to have the original source code on hand. Thus, for example, data structures can be hooked into the program without extensive reverse engineering when the source code is not available.

The technique of the present invention can be adapted for any computer language, development environment, type of program, etc. Substep 304 can be performed by someone other than the original programmer and can be performed without knowledge of the details of the original program. In fact, substeps 302,304 and 308–310, can be performed independently of each other and essentially without knowledge of the details required to perform any of the other substeps.

An advantage of the present invention is that an end-user is not required to perform any special steps in achieving the advantages provided by the present invention. In substep 306, the program is loaded and run as any program would be regardless of the provisions generated in substep 304. At substep 312, all of the redirecting of symbol references is done automatically by code that is part of the executing program or that is ancillary to the executing program and can be launched by the operating system. Or by other means with or without the intervention of the end-user.

Table I shows examples of source code modules and their contents. Table I is an enormously simplified example of what a programmer could write in substep 302—the act of creating a program.

TABLE I

Module "Example"
extern void funct_b( );
extern char *string_ptr;
main ( )
{
 funct_a( );
 funct_b( );
 printf("Dynaplay", string_ptr);
}
funct_a( )
{
}
Module "Data"
char string_ptr[ ] = "Rules!\n";

TABLE I-continued

Module "Example2"
funct_b( )
{
}

Typically, a program is made up of many modules. Essentially, a module is nothing more than a separate file that contains program code, or data, in a human-readable form. Having discrete files makes the program easier to work with in terms of loading portions of the program into a word processor and maneuvering among parts of the program. Also, each module logically contains portions of code that perform related functions. Each module typically has a name that indicates the types of functions, processing, data, etc., that are contained within the module.

In Table I, module "Example" includes 11 lines of source code. This code is written in the C computer language and, although it is very simplistic, will actually compile and produce a usable object module as discussed later in this application.

As will be apparent to one of skill in the art, the code in the Example module references code and data structures by the use of "symbols." The symbols are nothing more than alphanumeric names that are chosen to provide a logical and easily remembered environment within which the programmer can work.

For example, in Table I the module Example contains references to the following symbols: "funct_B," "string_ptr," "funct_A" and "printf." Each referenced symbol must be "defined" within one of the modules that make up the program. For example, the symbol "funct_A" is defined within the same module that references it, that is, within the Example module.

In contrast, the symbol "funct_B" is defined in a different module, namely the module Example2. In the Example, the symbols "funct_A" and "funct_B" are functions, or subroutines, which, in this case, do not perform any action at all. References to "function_A" and "funct_B" are shown at lines 5 and 6, respectively, of module Example.

The symbol "string_ptr" is defined in module Data.

The symbol "printf" is not defined in any of the modules shown in Table I. Instead, this symbol is a function that is defined in a standard library that is provided with all implementations of the C computer language. Normally, symbols that have definitions external to a module which references those symbols are declared at the beginning of the module as "external" symbols. This is the case with the symbols "func_B" and "string_ptr" as shown in the first two lines, respectively, of the module Example. The symbol "printf" is not declared as an external symbol because that symbol is implicit to the C computer language and is specified by the C "library."

Each of the modules Example, Data and Example2 are compiled to produce corresponding object files. For example, the module Example would typically have the name of "Example.c" or "Example.ccp" which would compile into an object module with the name "Example.obj." These modules, along with a library file having a ".lib" extension, are then linked via a linker to produce a single "executable" file often referred to as an executable object or executable image having a ".exe" extension to the file name.

Figure 3C:
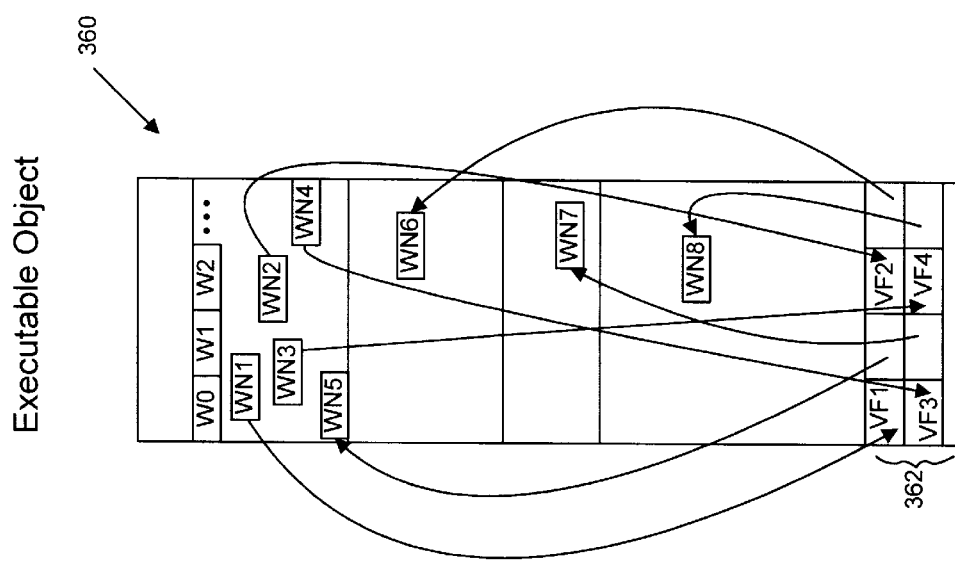
FIG. 3C is a diagram of a memory map of an executable object in the present invention.
Figure 3B:
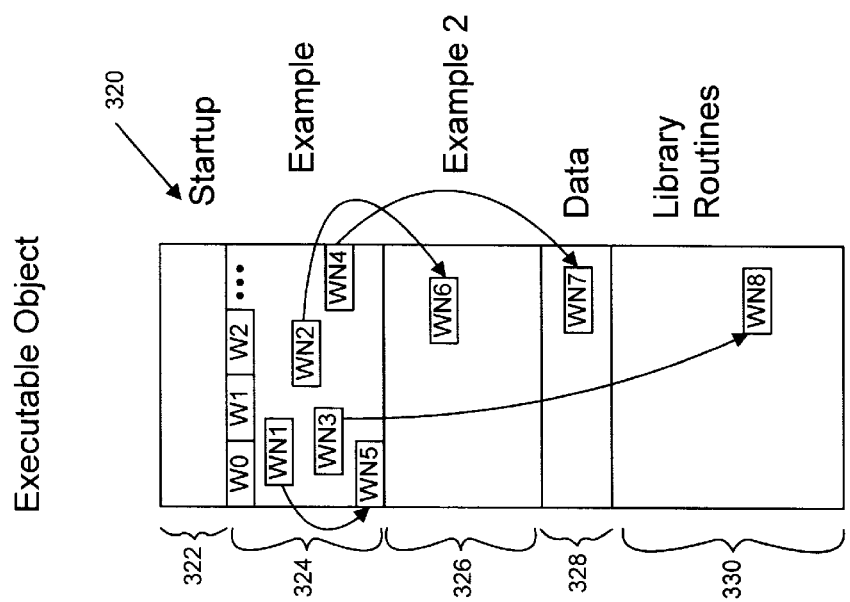
FIG. 3B is a diagram of a memory map of an executable object in the prior art.

FIG. 3B shows a diagram of a "memory map" of an executable object corresponding to the source code illustrated in Table I above. Note that FIG. 3B is representative of a resulting executable object as would be achieved using the techniques of prior art. In order to provide an overview of the aspects of the present invention dealing with executable objects and run-time images, the prior art memory map is presented alongside a memory map resulting from use of the present invention, shown in FIG. 3C, as discussed below.

FIG. 3B shows an executable object with five separate regions corresponding to the four different components, or modules, of the original program in Table I, along with an additional, startup section.

In FIG. 3B, executable object 320 includes a startup section 322, section 324 corresponding to the Example module, section 326 corresponding to the Example2 module, section 328 corresponding to the Data module and section 330 corresponding to the library routines. Startup section 322 is discussed in more detail below referring to run-time image execution. Section 324 corresponding to the Example module includes examples of words (typically, 16, 32 or 64 bits each) denoted W0, W1, W2, etc. Generally, there are thousands, tens of thousands, even millions or more words in a computer program. A computer program might also include dozens or hundreds of modules in accordance with the size of the computer program.

FIG. 3B also shows representative words such as "WN1," "WN2," etc. These words correspond to computer machine instructions that implement symbol references. Examples of such words can be a use of a variable name or reference to a data structure, an invocation of an instruction, a jump or call to a subroutine, a trap or exception or any other reference, flow control or use of an instruction or data item.

For example, the word WN1 can represent a reference to the symbol "funct_A" shown in Table I. Since the definition for the symbol "funct_A" resides in the same module as WN1, the reference by WN1 to WN5 is shown by an arrow to another location within the same section 324 corresponding to the Example module. Similarly, word WN2 corresponds to a reference to the definition corresponding to the symbol "funct_B." Since the definition for "funct_B" is in the module Example2, FIG. 3B shows the reference from WN2 to WN6, where WN6 resides in section 326 corresponding to module Example2.

In a likewise manner, WN3 represents an access, or reference, of the library function with symbol name "printf" shown as WN8 in section 330. WN4 implements the reference to string_ptr" defined starting at WN7 in section 128 which corresponds to the Data module.

Typically, such references use an address or other means of identifying the location of an instruction or data item. Any means for achieving the reference to the item is suitable for use with the present invention.

FIG. 3B shows run-time image 340 corresponding to executable object 320 of FIG. 3B.

In FIG. 3C, run-time image 140 includes the same sections as executable object 120 of FIG. 3B. At run-time, executable object 320 is loaded into memory and fixed addresses are assigned to instructions, data and other objects or items that may be used by the executing program. Of note is the prior art's handling of a device called a dynamically linked library (DLL) 342. At start-up time, start-up code at start-up section 344 is invoked prior to executing instructions in the actual program. Start-up code at Section 344 can load DLL 342 and establish "dynamic linking" by resolving references to items within DLL 342.

For example, in FIG. 3C, Section 348 corresponds to the loading of DLL 342, an association of the loaded information with run-time image 340. Within run-time image 340, machine word WN8 is an instruction that references an object starting at WN9 within Section 348 of the loaded DLL. For example, WN8 might be a reference to a function provided by DLL 342. Since it was not known prior to the loading of DLL 342 where the referenced item would reside, the reference to WN9 cannot be established until DLL 342 has been loaded. The prior art's use of DLLs requires that a programmer of the original program explicitly declare that a function being referenced will reside in a DLL that will be loaded at run-time. Furthermore, the function is typically one of many functions present in a given DLL. The entire collection of functions associated with the DLL is loaded at run-time. Resolving references in the program's code to items within the DLL can be performed at start-up time or during run-time by using "implicit" linking.

Figure 3E:
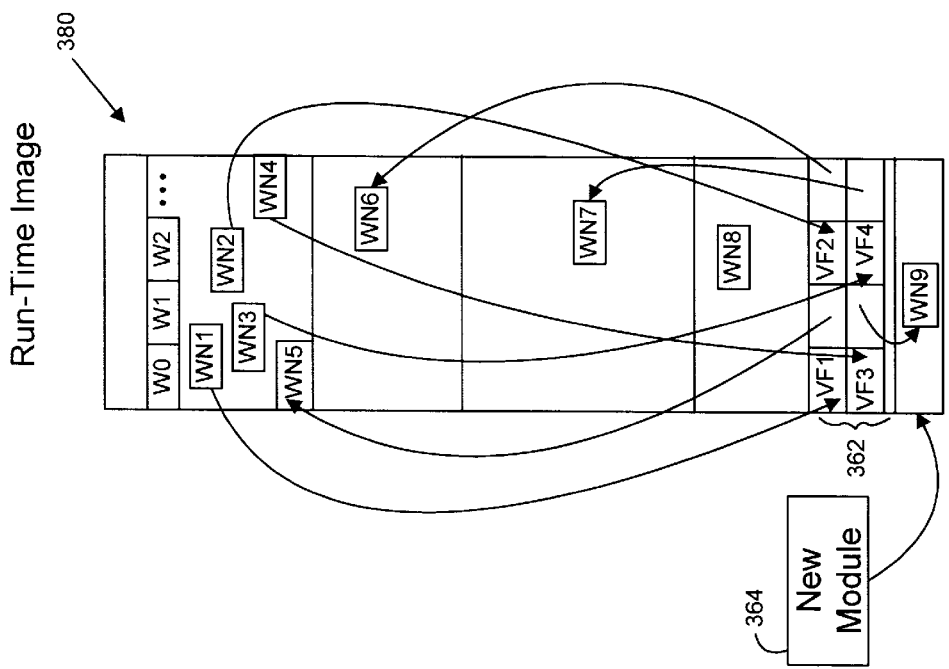
FIG. 3E is a diagram of an executing image in the present invention.
Figure 3D:
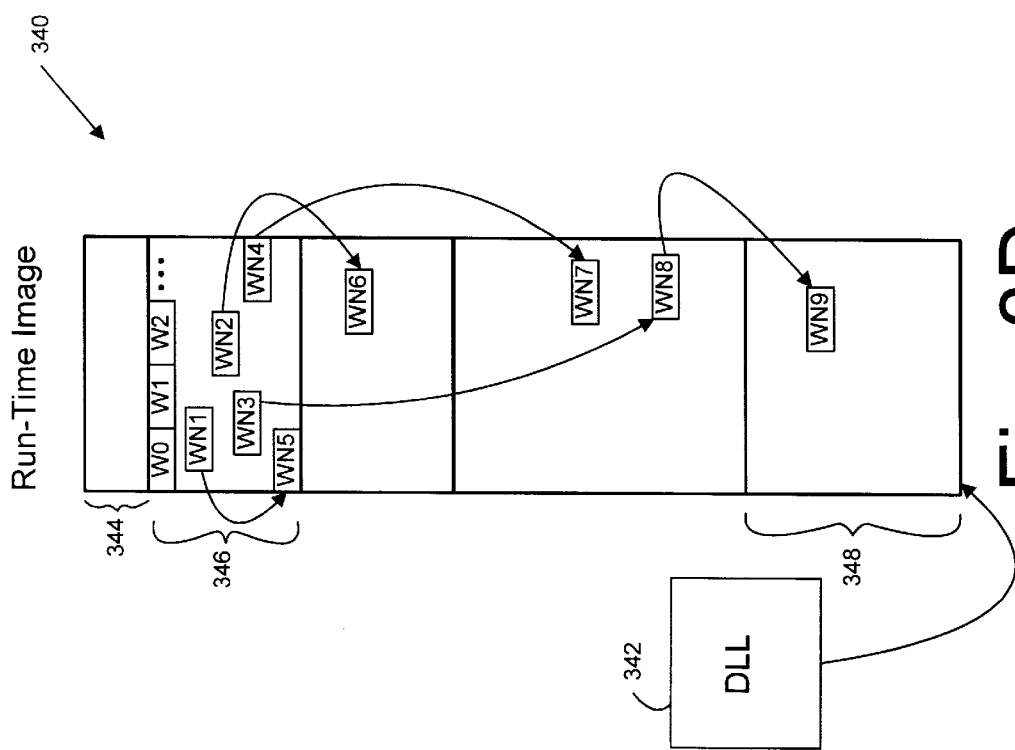
FIG. 3D is a diagram of an executing image in the prior art.

Having discussed FIGS. 3B and 3D of the prior art, above, FIGS. 3C and 3E are presented, below, to show how the executable object and run-time image constructs of the present invention differ.

FIG. 3C shows executable object 360 of the present invention. Executable object 360 implements the same modules and functionality as described by the source code of Table I. Note that the same references between the same words, or items, exist in executable object 360 of FIG. 3C, as in executable object 320 of FIG. 3B in the prior art example, except that each of the references is via a table 362 shown at the bottom of the memory map of executable object 360. For example, WN1, which references WN5 directly in the prior art FIG. 3B, now references entry VF1 in Table 362. Entry VF1 in Table 362, in turn, references WN5. This "indirect" or "generalized" referencing of symbols within executable object 360 is created automatically by tools and utilities of the present invention used to build the program in the Program Conversion Phase. The Program Conversion Phase, and other phases, are described below in the section on the Detailed Description of a Preferred Embodiment.

FIG. 3E illustrates run-time image 380 of the present invention. Similar to the correspondence between FIGS. 3B and 3C to illustrate differences between the present invention and the prior art, FIG. 3E corresponds to FIG. 3D in that the same sections are employed. However, because references are via Table 362, it is possible to change symbolic references arbitrarily as desired, to change the functionality of the compiled code at run-time.

For example, in FIG. 3E, the reference from WN4 (corresponding to the reference to the symbol string_ptr at module Example of Table I) which originally was through VF3 to WN7 is shown, instead, to refer to WN9 via VF3. Similarly, the reference from WN3 via VF4 to WN8 has been modified to instead reference WN7. Note that the object starting with WN9 can be program code, data, etc. that has been added at run-time and linked to a symbol reference via Table 362. The new module 364 of FIG. 3E behaves differently from DLL 342 of FIG. 3C in that new module 364 need not have been referred to in the initial program code. In other words, new module 364 can have a symbol such as "new_funct" which is not defined or declared in the source code shown in Table I.

Alternatively, the object beginning with word WN9 can be a modified, substituted, or changed version of an original object such as string_ptr originally defined starting at WN7. In this manner, new objects can be substituted under the same name as an original object in the original program. By substituting a "null" function for an existing function, that function can be effectively removed. By removing all data bytes in, for example, a bit map image, that image can be effectively deleted from the original program. By substituting a different image and using the same symbolic name as in the original program, that original image is effectively replaced. By providing a new symbol as a table entry for a newly-defined object that is loaded in from a new module, items can be added to the compiled program's run-time image.

As is discussed below, new module 364 is well-suited for providing modified functionality. Unlike a DLL, new module 364 can be compiled and linked without detailed knowledge of the original program modules and environment provided that the proper auxiliary files, discussed below, are available. Thus, changing the functionality of a compiled program with the system of the present invention is much easier, especially for a programmer, designer, or other person who is not familiar with all of the details of the original program. Knowledge of, and provision for, handling DLLs that the run-time image may already be loading is not required in order to modify the program. New modules created in this manner can be much smaller than an analogous DLL approach.

A feature of the present invention allows references to be changed while run-time image 380 is executing. That is, one embodiment of the invention provides an interpreted control language that specifies when symbol references are redirected. So, for example, the reference from WN1 through VF1 to WN5 can be switched to refer, instead, to WN8 at any point in the execution of run-time image 380. Such reference switching can be performed on different criteria such as (1) after a specified time interval, (2) when a specific instruction is executed, (3) when an interrupt is received or (4) when a pre-determined user input signal is detected. Other criteria are possible. Any arbitrary condition or state of the computer program or detected signal can be a criterion.

Since every symbol in the program is capable of redirection, or being "hooked," to another item (e.g., an instruction, data, a resource, etc.) the original program can be viewed as merely a framework within which further program development can take place. Only the broad top-level design of a program needs to be known, such as where and how a subroutine or data structure is used. For example, in a computer game program the data structures that display advertisement images in the background scenes can be updated by a single download of a new module containing the new image or images. To construct the new "add-on" module all that is required is to know the symbol name of the data structure originally used in the program. The "add-on" module size will be essentially the same size as the new image since the overhead presented by the system to hook the new image (i.e., the add-on module) into the existing run-time program is negligible.

Any subroutine or function in the existing program can be hooked with a new module subroutine or function to replace the original one. In this manner, bug fixes, previously accomplished by patches, are much easier to design and are incorporated automatically and immediately. That is, no user intervention is required and there is no perceptible delay at startup time to implement the new subroutine. Customized programs are possible so that different users can be running programs with different functionality on their machines even though the base program is the same. For example, in a music sequencing program a subroutine that displays a horizontal timeline can be replaced with a new module that orients the timeline in a vertical manner only for those users who choose to download a new module with the vertical timeline functionality. Third party add-ons become a simple matter so that companies other than the original manufacturer of the software can modify functionality to provide an improved, or merely different, software product.

Although the present invention is described herein as redirecting all symbols in a program, the number of symbols that are redirected is optional. For some programs many of the benefits of the invention can be realized by redirecting only a subset of symbols. However, an advantage of converting a program to provide for redirecting all symbols is that any unanticipated symbol can be redirected at a later time.

3. Conversion of an Original Program

A preferred embodiment of the invention is a system called "DynaPlayl™" developed by SegaSoft Corporation. The DynaPlay system provides a Software Developer's Toolkit (SDK) that includes executable routines such as "dynaobj," "dynamap," and "dynagen," discussed below. The source code for these routines is included in the attached Source Code Appendix which should be consulted for complete details on the operation of these routines and their exact input requirements and output formats. Also included in the Appendix are batch control files for automating steps described in this specification. Specifically, the "dynamize.bat" file invokes "dynabat.bat" to automatically perform steps in the Program Conversion Phase of the invention. "dynamod.bat" invokes "dynabat2.bat" to perform steps in the Add-On Development Phase of the invention.

In the DynaPlay tools provided by the SDK, the process of converting a program to provide for redirecting symbol references in the program (i.e., performing substep 304 of FIG. 3A) is called "dynamizing" the program. After performing substep 304, the program is said to be "dynamized" in that it's symbol references can easily be redirected at run-time.

The new modules created as part of the Add-On Development Phase process are called "dynamodules." The dynamodules are the result of performing steps 308 and 310 in FIG. 3A.

Figure 4:
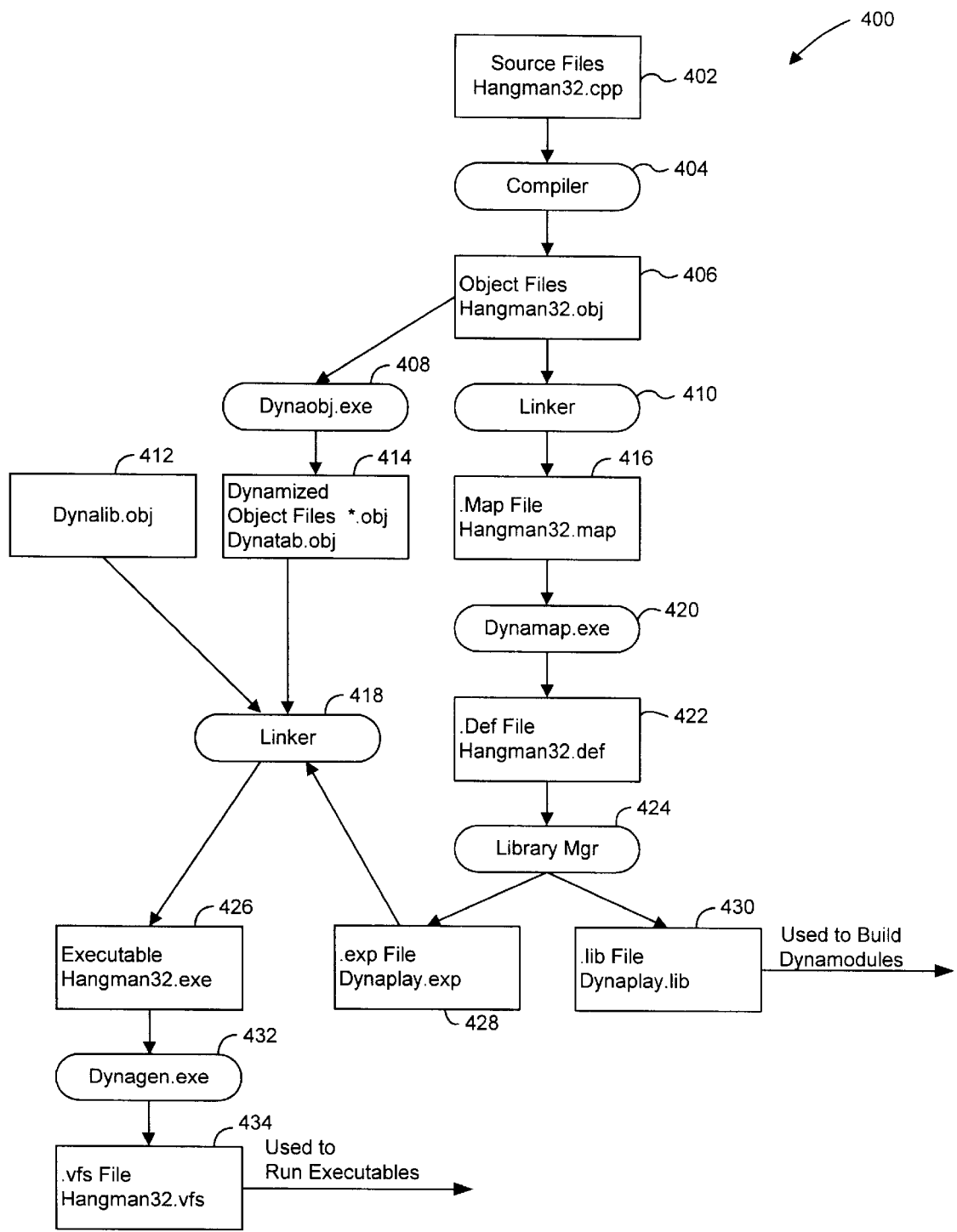
FIG. 4 illustrates the Program Conversion Phase of the system of the present invention.

FIG. 4 illustrates the Program Conversion Phase of the system of the present invention.

In FIG. 4 an examplary conversion of a program called "Hangman32.cpp" is shown. Hangman32.cpp is a C++ language program developed in the Microsoft Developer's Environment version 4.7, from Microsoft, Corporation. Naturally, the invention can be adapted for any computer language, developer's environment or operating system. The conversion process is called "dynamizing" the program. After dynamizing the Hangman32.cpp program, a dynamized executable object is produced as "Hangman32.exe." The dynamized executable is much the same as a non-dynamized executable except that provision now exists for hooking into the symbols at run-time. That is, symbol references to items such as processes, subroutines, functions, data structures and resources can be re-directed at run-time. The dynamizing process also generates files "Hangman32.vfs" and "Dynaplay.lib" which are used, respectively, to execute the dynamized program, and to build new add-on modules, or "dynamodules."

FIG. 4, shows flowchart 400 where files are shown in boxes and processes are shown in ovals. File Hangman32.cpp at 402 is a source code file that is processed by compiler 404. Compiler 404 can be a standard compiler. In the preferred embodiment, the compiler is directed to insert symbolic names in the output (.obj) files. These symbolic names are later substituted as discussed below. The result of the compilation process is an object file, Hangman32.obj, at 406. Note that although the example uses a single module and resulting single object file, any number of modules, object files, libraries, etc., can be used. The object files are submitted to linker 410 which can be any standard linker. The linker must be directed to generate a map file so that a list of all symbols, and modules defining and using the symbols, is produced in a file such as the Hangman32.map file at 416.

The map file is used as the input to Dynamap.exe 420 which processes entries in the .map file to create a .def file at 422, in which each symbol is "exported." A typical function in Hangman32.cpp which becomes dynamized is the function "OnGameNew( )". This function is called when the user selects a new game. Thus, allowing subsequent modification of the function is useful, for example, to initialize new parameters. The entry for OnGameNew( ) in the Hangman32.map file is as shown in Table II.

TABLE II

| | |
|---|---|
| 0001:000031c0 | ?OnGameNew@CHangman32Dlg@@IAEXXZ |

TABLE II-continued

| | |
|---|---|
| 004041c0 | fHangman32Dlg.obj |

In the DEF file generated by the DYNAMAP command, the same symbol appears in the EXPORTS section as shown in Table III. Table IV shows a larger, but still partial, listing of the entries in the def file. The complete listing includes several hundred entries.

TABLE III

NAME "Hangman32.exe"
EXPORTS
?OnGameNew@CHangman32Dlg@@IAEXXZ @66 NONAME

TABLE IV

-------- Def file Application --------------
;C:\Program Files\HEAT\Net Fighter\Net Fighter.def
NAME "Net Fighter.exe"
EXPORTS
?RefillTrackBuffer@@YAHPAUINTRACKSTATE@@@Z @1 NONAME
?GetTrackByte@@YAHPAUINTRACKSTATE@@PAE@Z @2 NONAME
?GetTrackVDWord@@YAHPAUINTRACKSTATE@@PAK@Z @3 NONAME
?ConverterCleanup@@YAXXZ @4 NONAME
?ConverterInit@@YAHPAD@Z @5 NONAME
?RewindConverter@@YAHXZ @6 NONAME
?AddEventToStreamBuffer@@YAHPAUTEMPEVENT@@PAU_ConvertInfo@@@Z @7 NONAME
?GetTrackEvent@@YAHPAUINTRACKSTATE@@PAUTEMPEVENT@@@Z @8 NONAME
?ConvertToBuffer@@YAHKPAU_ConvertInfo@@@Z @9 NONAME
?MidiProc@@YGXPAXIKKK@Z @10 NONAME
?StreamBufferSetup@@YAHXZ @11 NONAME
?PlayMidi@@YAXPAD@Z @12 NONAME
?StopMidi@@YAXXZ @13 NONAME
?checkmidi@@YAXXZ @14 NONAME
?SetAllChannelVolumes@@YAXK@Z @15 NONAME
?SortSpriteList@@YAXXZ @16 NONAME
?DrawSpriteList@@YAXXZ @17 NONAME
?spriteput@@YAXPAEHHPAG@Z @18 NONAME
?spriteputanti@@YAXPAEHHPAG@Z @19 NONAME
?spriteputaddtrans@@YAXPAEHHPAGH@Z @20 NONAME
?spriteputtrans@@YAXUtagRECT@@0HPAG@Z @21 NONAME
?spriteputtransf@@YAXUtagRECT@@0HPAG@Z @22 NONAME
?DrawStats@@YAXXZ @23 NONAME
?spriteShadow@@YAXPAEHHPAG@Z @24 NONAME
?DrawShadow@@YAXHHHHPADDEPAGPAU_DDSURFACEDESC@@@Z @25 NONAME
?putsprite@@YAXHHHHPADDEPAGPAU_DDSURFACEDESC@@H@Z @26 NONAME
?CreateDSound@@YAHPAX@Z @27 NONAME
?CreateDSSound@@YAHPAUSOUNDEFFECT@@PAD@Z @28 NONAME
?SoundPlay@@YAXH@Z @29 NONAME
?SoundPlay2@@YAXH@Z @30 NONAME
?SoundPlay3@@YAXHH@Z @31 NONAME
?SoundStop@@YAXH@Z @32 NONAME
?KillSound@@YAXH@Z @33 NONAME
?SetPrimFormat@@YAXH@Z @34 NONAME
?FillDataBuffer@@YAXXZ @35 NONAME
?KillDSSoundStream@@YAXXZ @36 NONAME
?CreateDSSoundStream@@YAHPAD@Z @37 NONAME
?TimeFunc@@YGXIIKKK@Z @38 NONAME
?DoKrystal@@YAXH@Z @39 NONAME
?DoKrystalGravity@@YAXH@Z @40 NONAME
?DoKrystalDamage@@YAHH@Z @41 NONAME
?RecieveKrystalDamage@@YAXHH@Z @42 NONAME
?DoPhreak@@YAXH@Z @43 NONAME
?DoPhreakGravity@@YAXH@Z @44 NONAME
?DoPhreakDamage@@YAHH@Z @45 NONAME
?RecievePhreakDamage@@YAXHH@Z @46 NONAME
?DoRipper@@YAXH@Z @47 NONAME
?DoRipperGravity@@YAXH@Z @48 NONAME
?DoRipperDamage@@YAHH@Z @49 NONAME
?RecieveRipperDamage@@YAXHH@Z @50 NONAME TABLE IV-continued

```
LoadSSAPI @51 NONAME
MPGetProcAddressInternal @52 NONAME
MPGetProcAddressOptional @53 NONAME
MPGetProcAddress @54 NONAME
MPLookupFunctionName @55 NONAME
MPLoadMPlayerDLL @56 NONAME
MPSetDLLName @57 NONAME
MPlayerInit @58 NONAME
MPlayerDestroy @59 NONAME
?InitKeys@@YAHXZ @60 NONAME
?debounce_keys@@YAXXZ @61 NONAME
?ReadKeys@@YAXH@Z @62 NONAME
?KillKeys@@YAXXZ @63 NONAME
?Play_CD@@YAXXZ @64 NONAME
?Stop_CD@@YAXXZ @65 NONAME
?DoPsirox@@YAXH@Z @66 NONAME
?DoPsiroxGravity@@YAXH@Z @67 NONAME
?DoPsiroxDamage@@YAHH@Z @68 NONAME
?RecievePsiroxDamage@@YAXHH@Z @69 NONAME
?do_dead@@YAXXZ @70 NONAME
?check_dead@@YAXHH@Z @71 NONAME
?do_damage@@YAXH@Z @72 NONAME
?do_block@@YAXH@Z @73 NONAME
?do_block_sp@@YAXH@Z @74 NONAME
?do_recoil@@YAHH@Z @75 NONAME
?do_effect_check@@YAXH@Z @76 NONAME
?CheckCollision@@YAHHHHHPAH@Z @77 NONAME
?do_special_recoil@@YAXH@Z @78 NONAME
?CheckCharacterCollision@@YAXXZ @79 NONAME
?CheckSpecialCollision@@YAXXZ @80 NONAME
?create_effect@@YAXH@Z @81 NONAME
?do_effect@@YAXXZ @82 NONAME
?makettable@@YAXXZ @83 NONAME
?DrawGame@@YAXXZ @84 NONAME
?DrawScreen@@YAXXZ @85 NONAME
?DrawTextA@@YAXPADHHKHHHH@Z @86 NONAME
```

By designating each symbol for export, the .def file is setting up further building of the symbols for re-directing by allowing processes handling references to the symbols to assume that the symbols are defined externally to any modules in the program project. The symbols, along with their forced "export" designation propagate to other standard files used in the build. For example, the .def file is provided to Library Manager 424 which is a standard library manager. The library manager is directed to generate a DynaPlay.lib file that is an auxiliary file used later in the Add-On Development phase, discussed below, where add-on dyna-modules are created. The library manager also generates a Dynaplay.exp file at 428 which is used in the second linking of the object modules of the program project.

A second linking of the object modules is used to create a program with substituted symbol names. This is the first real link since the first linking, by linker 410, was just used to generate a .map file. Prior to the second linking, Dynaobj.exe 408 is run with the .obj files of the program (Hangman32.obj, in this case) as the input to Dynaobj.exe. This results in "dynamized" object files with a .dbj extension.

Each dynamized object file's definitions have a modified symbol that is different from the original symbol. Specifically, each original symbol definition is prefaced with "dyna_" so that, for example, the definition for "OnGameNew( )" would be "dyna_OnGameNew( )" within Hangman32.dbj. The .dbj files are linked with Dynalib.obj which inserts code to invoke routines from a dynalib.dll library at run-time. These routines determine the redirecting of symbol referencing, both prior to, and during, execution of the program. The routines in dynalib.dll are discussed below in Section 5.

The .dbj files are also linked with Dynatab.obj which is a structure created by Dynaobj.exe as shown at 414. Dynatab.obj provides the table structure for handling indirect symbol references. Dynatab.obj contains binary information on associating a reference with a symbol. It is created from a .def file. For a detailed description of the format consult the Source Code Appendix for the Dynaobj.exe program. Dynatab.obj is the table structure that defines associations between the first (original) symbol reference and the new, renamed, "proxy" symbol reference. In FIGS. 3C and 3E, for example, this is table 362 where VF1 is the address (i.e, table entry, or address value of the new symbol) of a jump instruction to machine instruction WN5 (the address value of the original symbol). The source code for Dynaobj.exe in the Appendix should be consulted for the exact format of the table. Also, although the table is shown at the bottom of the memory map in FIGS. 3C and 3E, the table may be positioned anywhere within the system RAM. The table may even reside in virtual memory, external storage, on a network server, etc. Also, there may be more than one table.

Although the preferred embodiment modifies the symbol definitions, the same effect of symbol indirection can be accomplished by keeping the symbold definitions the same and modifying the symbol references. That is, the "dyna_" prefix can be added to each reference to a symbol definition. The table would then associate the substituted symbol references with the original named definitions.

Other mechanisms for accomplishing the indirect symbol referencing are possible. For example, the table can be replaced by a list of pointers to portions of the code that have symbol references that are to be changed. In this manner, the need for two address fetches is avoided. For example, in FIG. 3C the present approach of a machine instruction at WN1 causing a fetch of an address at VF1, followed by a fetch of the target instruction WN5 causes an extra address fetch before WN5 can be executed. If WN1, instead, pointed directly to WN5 so that WN5 can be directly obtained then execution of the program is faster. Table 362 would then have a pointer to WN1 so that when WN1's reference to WN5 needed to be re-directed it can be achieved by modifying the value of WN1 (this assumes WN1 includes an immediate address target branch). A drawback in this approach, however, is that there must be a pointer to each location in the program that originally accesses WN5. The present approach only requires changing a single table entry to redirect all prior references to any given symbol.

Linker 418 resolves all original symbol references by using the original symbol names in Dynaplay.exp 428. The result of the link operation performed by Linker 418 of FIG. 4 is the Hangman32.exe executable 426. The executable has a structure similar to the structure of FIG. 3C in that symbol references are now redirected through a data structure such as table 362 of FIG. 3C.

Finally, dynagen.exe 432 is run on the application executable, Hangman32.exe, to create Hangman32.vfs. The .vfs file is part of the "virtual file system." This file is used to specify which modules, functions, processes, data structures, etc., are used to satisfy symbol references at run-time. These features of the system are discussed in more detail, below.

Figures 6A, 6B:
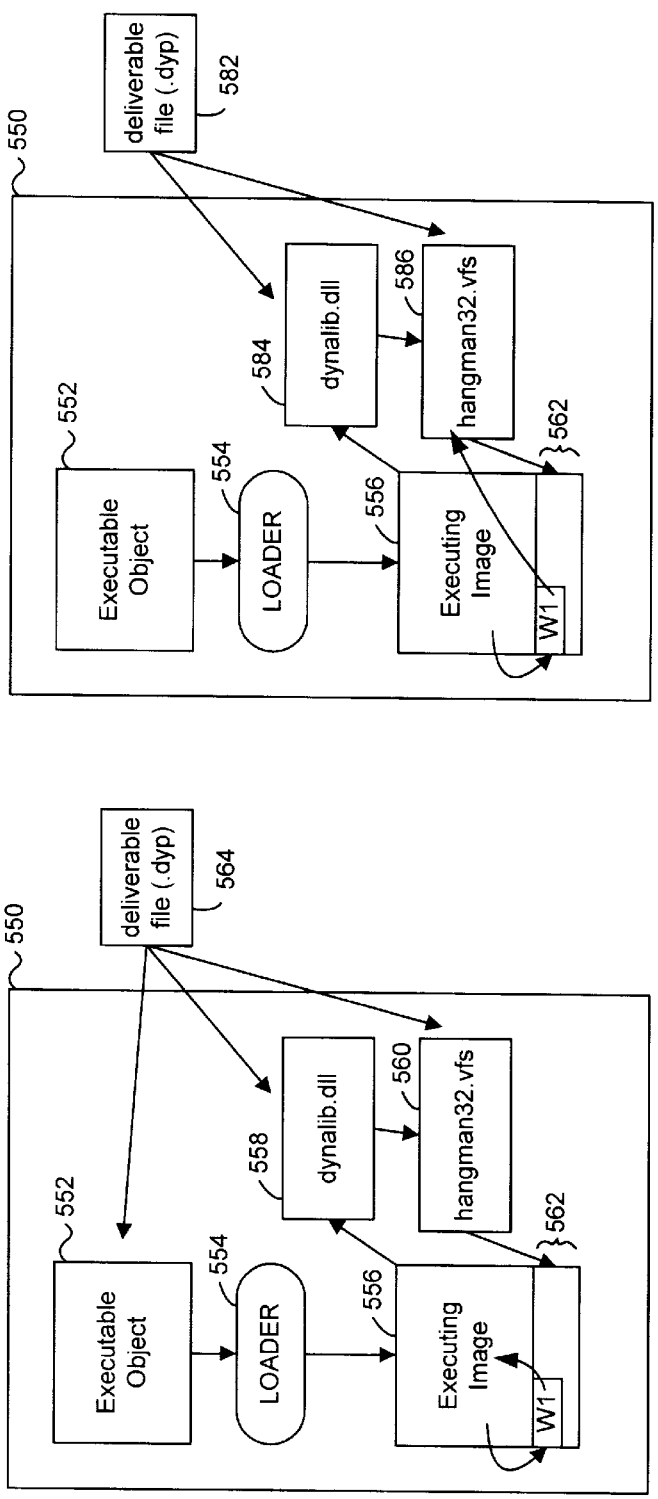
FIG. 6A illustrates the process of executing a dynamized program in a user's computer.
FIG. 6B illustrates the process of executing a dynamodule in a user's computer.

After the program is dynamized by performing the steps shown in FIG. 4, a "deliverable" file is created. In the preferred embodiment, the deliverable file is a compressed file that expands into the executable object, hangman32.exe; the virtual file system file, hangman32.vfs; and the dynamically linked library dynalib.dll. The existence of these files in the user's machine is shown in FIG. 6A as files 556, 558 and 560, respectively. In the preferred embodiment, the deliverable file has the extension ".dyp". The user must install the files by extracting the dyp file, executing a "dynainstall.exe" program (provided as an extracted file) and running the installed program. The user is able to load and run the dynamized version of the program in the standard way (i.e., in Windows 95 by specifying the name of the executable, by clicking on an icon associated with the executable).

FIG. 6A illustrates the process of executing a dynamized program in the user's computer. This is a detailed version of step 306 in FIG. 3A. In this case, the user is executing a dynamized version of the original application program without add-on modules (discussed below). So, although the symbol references have been provided with redirection, all of the symbols map to their originally intended items as contemplated by the original programmers of the application. That is, the run-time functionality of the program has not yet been modified.

In FIG. 6A, executable object 552 is loaded by loader 554 into the system RAM of the user's machine as executing image 556. Executing image 556 includes a dynamap area 562 where associations are made between the original symbol references and original item definitions. Upon startup of executing image 556, routines in dynalib.dll 558 are called which access procedures and data in Hangman32.vfs 560. These routines and data in the .vfs file specify how to redirect references in the executing image 556 by changing values in dynatable 562. However, since this is the dynamized original version of the program without add-on modules, no changes to the dynatable are made. After the .vfs file is processed, executing image 556 executes to provide functionality in the user's machine as specified by the original source code. An example of a symbol reference link is shown where executing image 556 references a symbol through pointer W1. W1 points to an item definition within executing image 556.

Once a program has been dynamized so that its symbol references can be easily redirected, the program can be loaded and run, as illustrated at step 306 of FIG. 3A. The program behaves as originally designed. That is, the dynamized program performs the same functions in the same way as if the program had not been dynamized. However, since symbol references are now redirected, execution of each reference may be slower than in the original non-dynamized version of the program. Cases where the references will not be slower is in processors where performing redirected accesses does not increase the execution time. This can be the case in pipelined processors, processors with optimized caching, etc. Also, where symbol accesses are by indirect means in the first place (e.g., calling a subroutine via a pointer to the subroutine in the original source code), dynamizing the symbol reference does not increase the overhead in the symbol access.

The dynamized version of the executable differs from its non-dynamized version in that extra storage is needed to hold the dyna table that provides the indirect links to symbols. The size of the table depends on the number of symbols dynamized. For example, a programmer can be provided with compiler directives such as "#dyna-on" and "#dyna-off" to prevent all of the symbols from being dynamized. Auxiliary files, discussed below, also add to the overhead in achieving run-time modification of the program. However, the size and speed impacts will usually be negligible. The advantages of having an easily-modifiable executable typically will far outweigh the small increase in executable size, number of files and increased execution time, if any, which, in most applications, will be completely undetectable to the user.

4. Creating Add-On ("Dyna") Modules

Figure 5:
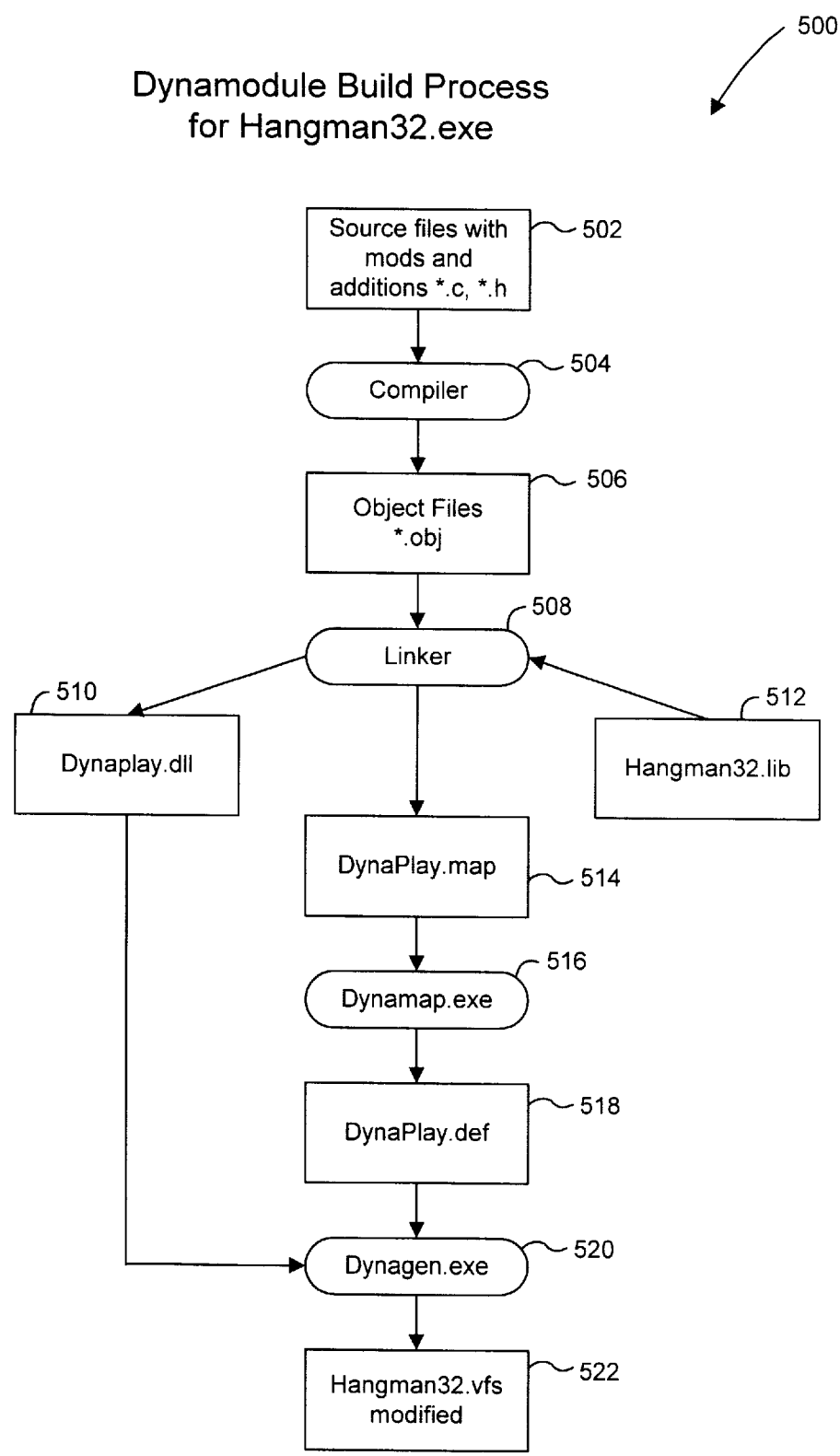
FIG. 5 shows a flowchart illustrating steps in the Add-On Development Phase of the present invention.

FIG. 5 shows flowchart 500 illustrating the steps in the Add-On Development phase of the present invention. The Add-On Development phase produces modified executable object information in the form of a DLL for linking to the original program at run-time. The Add-On Development phase also produces auxiliary files that are used at, or just prior to, run-time to determine how the symbol links are re-directed. Essentially, modification of run-time functionality is obtained by substituting different definitions for items (i.e., executable code, data structures, etc.) defined in the original program.

In FIG. 5, a programmer modifies source code modules from the original application program to produce modified source code modules 502. Although it is not necessary for the programmer to begin with the original source code modules, in practice it makes modification of the original program easier because all of the symbol references and program structure are already present. The modifications can include new items such as functions, processes, data structures, etc. Modifications can also include deleting existing items, but deletions are best preformed by "stubbing out" functions or removing all data from a structure while leaving a "dummy" symbol definition of the structure or resource intact so that all references to the structure or resource do not have to be deleted. By leaving the symbol definition, data can later be easily added back to the deleted item.

Modified source code modules 502 are compiled by compiler 504. Note that compilation may be for more than the modified portion of the program since the module containing the modified portion of the program may contain other, unmodified, portions of source code.

Linker 508 is used to link the compiled modified object modules with library definitions 512. Library definitions 512 is the same file as file 430 of FIG. 4. This file provides all of the symbol definitions for the symbols in the original application program so that linking of the modified modules can take place without symbol reference errors. The result of the link is dynaplay.dll, a DLL that contains the new items to be hooked into the original program at run-time.

Dynaplay.map is the input to dynamap.exe which generates a .def file 518 in the same manner as the hangman32.def file was generated by dynamap.exe 420 of FIG. 4. An example of a .def file from a dynamodule is shown below in Table V.

TABLE V

```
---------------- DynaModule def file -----------------------
;C:\Program Files\Net
Fighter\DynaModules\SelfAndHEAT\DynaRelease\SelfAndHEAT.def
NAME "SelfAndHEAT.dll"
EXPORTS
?DrawGame@@YAXXZ @1 NONAME 0x1000
?init_ai@@YAXXZ @2 NONAME 0x1ec0
?CharacterNotIdle@@YAHXZ @3 NONAME 0x1ed0
?do_ai@@YAXXZ @4 NONAME 0x1f40
?ai_retreat@@YAXXZ @5 NONAME 0x23a0
?ai_forward@@YAXXZ @6 NONAME 0x23c0
?ai_jump@@YAXXZ @7 NONAME 0x23f0
?ai_groundattack@@YAXXZ @8 NONAME 0x2460
?ai_block@@YAXXZ @9 NONAME 0x24d0
?ai_quickattack@@YAXXZ @10 NONAME 0x2530
?ai_mediumattack@@YAXXZ @11 NONAME 0x2590
?ai_longattack@@YAXXZ @12 NONAME 0x2610
?ai_comboattack@@YAXXZ @13 NONAME 0x2680
?ai_specialattack@@YAXXZ @14 NONAME 0x26b0
?ai_do_attack@@YAXW4ANIM_NUMBERS@@@Z @15 NONAME 0x2700
?GetAICharacter@@YA?AW4FIGHTERS@@XZ @16 NONAME 0x2770
?SetAICharacter@@YAXW4FIGHTERS@@@Z @17 NONAME 0x2990
?ProcessCharacterSelection@@YAXXZ @18 NONAME 0x2b80
?SetupDD@@YAHXZ @19 NONAME 0x3ab0
?WindowProc@@YGJPAXIIJ@Z @20 NONAME 0x3d10
?SettingMe@@YAXPAD@Z @21 NONAME 0x4870
WinMain@16 @22 NONAME 0x48e0
?BackToMenu@@YAXXZ @23 NONAME 0x4e70
?TempSetUpConnect@@YAXXZ @24 NONAME 0x5020
?JointProcessControl@@YAXXZ @25 NONAME 0x5090
?ProcessUpdate@@YAXXZ @26 NONAME 0x5280
?DrawImposeText@@YAXPAUIDirectDrawSurface@@PADH@Z @27 NONAME 0x65f0
?TextScrollSetUp@@YAXPADHHHHH@Z @28 NONAME 0x66e0
?DisplayTextScroll@@YAXXZ @29 NONAME 0x6800
?CheckForMPError@@YAHXZ @30 NONAME 0x69e0
?joinleavenotify@@YAXKPADHPAX@Z @31 NONAME 0x6a50
?MP_Init@@YAHXZ @32 NONAME 0x6b90
?CalculateMyLatency@@YAXXZ @33 NONAME 0x7280
?FindMplayerIndex@@YAHK@Z @34 NONAME 0x7310
?MP_Synchronize@@YAHXZ @35 NONAME 0x7350
?MP_Synchronize2@@YAHXZ @36 NONAME 0x78e0
?SendPacket@@YAXH@Z @37 NONAME 0x7e40
?SendPacket2@@YAXH@Z @38 NONAME 0x8370
?SendPacket3@@YAXHH@Z @39 NONAME 0x85e0
?ReceivePacket@@YAXXZ @40 NONAME 0x86d0
?ReceivePacket2@@YAXXZ @41 NONAME 0x94a0
?ProcessCharacter@@YAXH@Z @42 NONAME 0x9a70
```

Although the .dll of the present invention uses a common file extension, namely, ".dll," the .dll of the present invention differs significantly from the .d11 format and use of the prior art. As described herein, changing the functionality of a program in the present invention is via symbol references in a table residing with the run-time program. Traditional DLLs require the use of API routines to access DLL functionality. This introduces size and operating overheads into the traditional DLL approach. The API interface must be carried with the DLL library which makes it inefficient as a vehicle for introducing small amounts of new code or data to change functionality. Using an API interface also slows down the execution of the program as the interface routines must be executed to interact with the DLL routines. Requiring the application program to use API routines also reduces the types of changes in functionality from those provided by the approach of the present invention.

Linker 508 also generates dynaplay.map 514 which includes the symbols used in the linking of the new modules.

The def file is used as the input to dynagen.exe 520 which generates a .vfs file 522. The .vfs file includes information on how to redirect symbol references at, or prior to, run-time. The function of the .vfs file is discussed in more detail, below.

5. Referencing the Add-On Modules at Run-Time

After a dynamized program and add-on dynamodules are loaded into a user's machine, modification of the functionality of the dynamized program is controlled by changing symbolic reference links in the dynamap table.

FIGS. 6A and 6B illustrate symbolic reference link modification occuring in the user's machine. As discussed above, FIG. 6A shows the dynamized program as it initially operates without add-on dynamodules. FIG. 6B shows the dynamized program where redirection of a link now causes the symbol associated with the link to reference an item within a dynamodule, i.e., the Hangman32.vfs file.

In FIG. 6B, deliverable file 582 is received by a user who is already in possession of the original dynamized program.

For example, a user may obtain a computer game that simulates combat between two characters. A dynamized version of the game can be obtained where the deliverable file (e.g., deliverable file 564 of FIG. 6A) is obtained by downloading from an Internet site, from a CDROM disc, etc. The user installs, loads and runs the game as described above in Section 3. The game is a fully-functional, standalone program that includes artwork for the characters and scene backgrounds, processes for animating the characters'fight moves, receiving user input to control the characters, keeping score, etc. After a few months the manufacturer of the original game (or another manufacturer) decides to add features to the original game. For example, a new fighting character is to be added and advertisements on the billboards in the background scenery are to be changed. The manufacturer does this by providing an add-on dynamodule in the form of deliverable file 582.

Deliverable file 582 expands to replace dynalib.dll 584 and hangman32.vfs 586. Usually, only the .vfs file needs to be replaced to implement new dynamodules. However, for upgrades to dynalib.dll it may also be replaced. Thus, the download size to add functionality is usually just the size of the changed items. This can be on the order of tens of kilobytes as opposed to tens of megabytes for the full program. The next time the game, represented by executable object 552, is loaded by loader 554 and run as executing image 556, item references are redirected so that processes to implement the new fighting character are called and data structures and processes to implement the new advertising images are accessed. The actual changing of the symbolic reference links is identical to that described for executing the dynamodule in FIG. 6A. However, this time the links are actually substituted so that new items are referenced. Thus, FIG. 6B shows a reference through W1 in the dynatable which now points to an item within hangman32.vfs file 586. This means that all references mapped through W1 now access an item provided in the dynamodules within hangman32.vfs.

Figure 7:
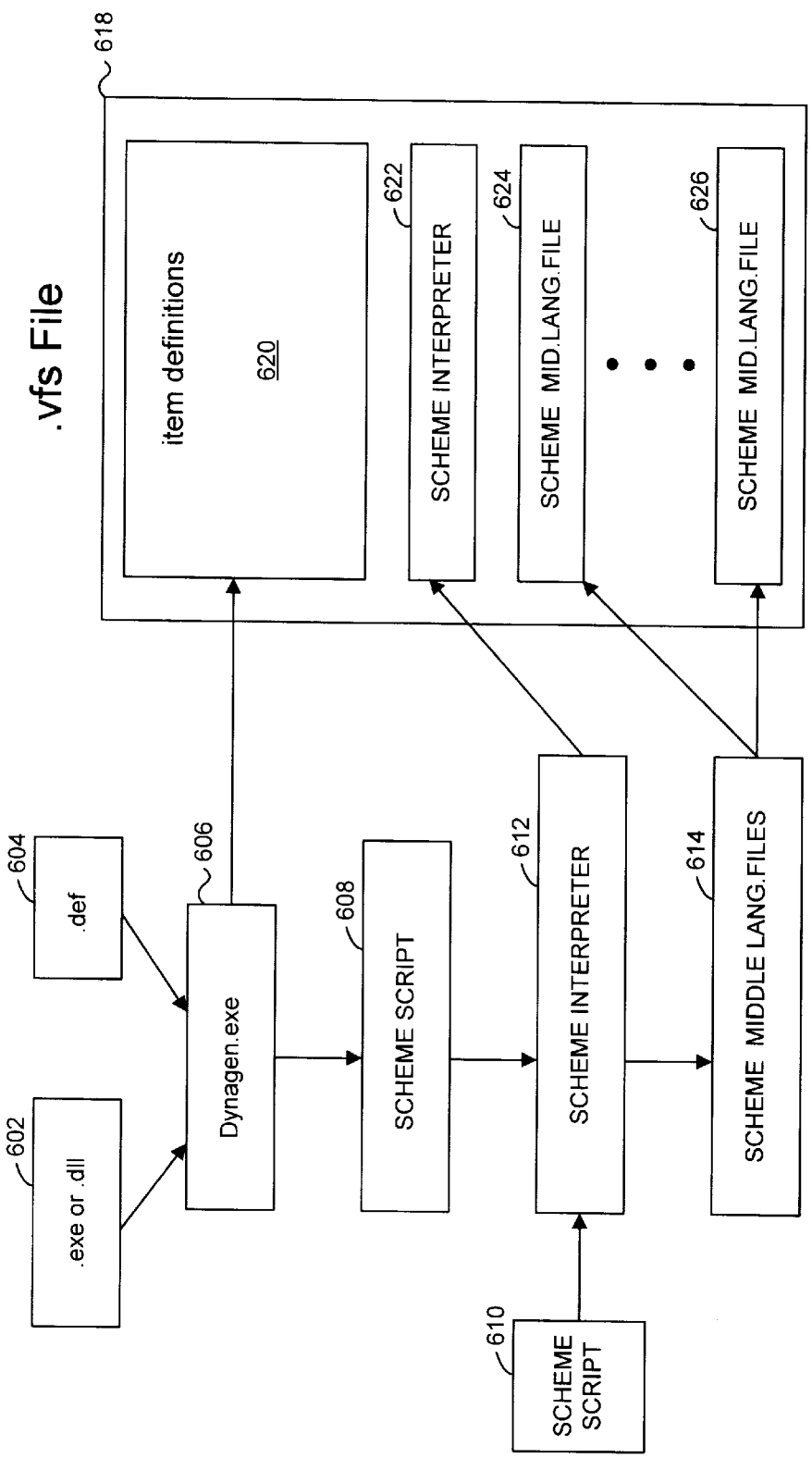
FIG. 7 shows details of objects within a .vfs file and how to those objects are generated.

FIG. 7 shows details of objects within a .vfs file and how to those objects are generated.

In FIG. 7, program dynagen.exe 606 generates item definitions 620 and SCHEME scripts 608 from .exe or .dll files 602 and .def files 604. All of these files, with the exception of the SCHEME scripts, have been discussed in detail above. The item definitions are binary executable instructions, data or other information, that become part of the .vfs file. These are the definitions to which references will be redirected at run-time. For details on the input and output of the dynagen.exe process, see the dynagen listing in the Source Code Appendix.

SCHEME scripts are source code files that can be interpreted at application program run-time to perform the symbol reference link redirection. That is, the SCHEME script controls the manner of swapping, or redirecting, pointers in the dynatable, such as dynatable 562 of FIG. 6B. The preferred embodiment uses a public domain SCHEME script interpreter that defines the language. Any suitable scripting language, or other control mechanism, can be employed. The particular mechanism that controls the swapping, or redirecting, of symbol references is a matter of choice as any language can suffice. The mechanism need not even be a human-readable language as, for example, where machine code is used to perform the swapping. However, providing a flexible human-readable scripting language as the mechanism has advantages as described below.

As shown in FIG. 7, SCHEME script can be provided from sources other than the dynagen.exe program.

SCHEME script 610, for example, can be produced manually by a human programmer, can be a pre-existing file, can be produced automatically or manually by a third party, etc. The SCHEME scripts are provided to the script interpreter that is instructed to produce a "middle language" version of the script. Typically, such middle language parallels the human-readable form of the script but is more compact and easier for a computer process to read and execute. The middle language, similar to binary instructions, is not easily readable by a human.

The middle language files 614 are included in the .vfs file, for example, as files 624 and 626, along with an instance of the interpreter 622. At run-time, when the executable image is started up, a call to dynaplay.dll routine "DllMain( )" results in interpretation of the SCHEME middle language files to handle redirection of references.

FIG. 8 is an example of SCHEME script generated by dynagen.exe.

In FIG. 8, lines at 650 represent a function call to "enable-dynamod" to perform replacement of reference links. The file location of the dynamodules to be linked are specified at 652 as "selfandheat.dll". The executable that will access the dynamodules is specified at 654 as "net_fighter.exe". Each subsequent pair of numbers designates an index in the dynamodule to substitute with a new address location. These correspond to the def files for the executable (net_fighter.exe) and the dynamodule (selfandheat.dll).

Using Table V as the .def file from the dynamodule, and Table IV as the (partial) table from the executable, the pair (84.#x1000) in the SCHEME script file of FIG. 8 specifies that the symbol DrawGame in the executable which has index 84, is to be mapped to the address at hexadecimal 1000 in the .dll. From Table V, it is shown that the address of the new procedure by the same name, DrawGame, will thus be accessed.

Because a script language is used to control the symbol reference redirections it is possible to make versatile swapping of references. For example, the script of FIG. 8 can be modified so that swapping of references occurs if a specific file is present, at a certain time of day or after a calendar date, when a check is made for a condition from the Internet, etc. In this way program features can be turned on or off depending on whether a user has paid extra money, a time limit has expired, depending on the number of players involved, etc. This also makes the program a flexible vehicle for customized information, such as advertising, that adapts to the user's interests, changes when the sponsor's account is up, etc. The present invention provides all of this flexibility via very small dynamodules that can be downloaded and hooked into an existing dynamized computer program. Moreover, the present invention provides for any existing program to be dynamized with very little specialized work.

The script instructions do not need to be confined to executing at start-up only. In a multi-threaded environment the script instructions can be executing "concurrently" with the execution of the original computer program and instructions provided by dynamodules. This provides increased flexibility to change references based on, e.g., user inputs, real time clocks, conditions that arise as a result of executing the program or other programs, etc.

Returning to FIG. 7, a feature of the .vfs file system is that everything in the .vfs file is non-human-readable. The item definitions 620 are in binary form as is the SCHEME interpreter 622. The SCHEME middle language files are also not readable since they have been pre-processed to derive the computer-readable middle language from the human-readable script. Thus, the .vfs file provides security to the manufacturer to prevent "hacking" of user's programs and to prevent other manufacturers from making add-on modules to be used with the original manufacturer's product unless permitted, e.g., by license.

Another feature of the .vfs format is that references to files by the SCHEME middle language instructions is limited to references within the .vfs file. This prevents, for example, an error in the SCHEME instructions from harming files, or other information and devices, on the user's machine.

Although the invention has been described with respect to specific embodiments, it should be apparent that many variations are possible. For example, the .vfs file format can vary widely. The .vfs file can be a hidden file, or files, so that the user is not generally aware of their existence. An interpreter need not exist within the .vfs file but can be part of the dynaplay.dll library, a different library, program or other entity. In general, the processing described by the present invention can be performed by any number of processes, programs or routines and can be accomplished by executing the functionality as described herein on any suitable platform or platforms. Thus the references to embodiments herein are but illustrative of the invention whose scope is limited only by the appended claims.

What is claimed is:

1. A method for converting a source computer program into an executable object having symbol references that can be redirected at run-time, the method executing on a computer system, the computer system including a processor and storage device, the computer system further including a computer program having symbolic references to original definitions having original names, the method comprising the following steps performed by the processor after completion of the creation of the source computer program:
   identifying one or more of the original names;
   renaming one or more original names used in the source computer program with new names;
   creating an association between the original names and the new names so that symbolic references to the original names invoke a reference to the new names; and
   subsequent to the above steps, performing the step of creating executable code from the source computer program, wherein the executable code uses the associations between the original names and the new names.

2. The method of claim 1, further comprising the step of storing information about the associations in a table format.

3. The method of claim 2, further comprising the steps of causing a symbolic reference to reference an entry in the table; and associating a pointer to an original definition with the entry.

4. The method of claim 1, wherein a compiler is used to compile the source computer program, the method further comprising the step of
   using information generated by the compiler to perform the step of identifying original names in the source computer program.

5. The method of claim 1, wherein a symbolic reference is to a data structure.

6. The method of claim 1, wherein a symbolic reference is to a program instruction.

7. The method of claim 1, wherein a symbolic reference is to a resource.

8. The method of claim 1, wherein a symbolic reference is to an object.

9. The method of claim 1, wherein a predetermined developer's environment is used to compile the source computer program, wherein the predetermined developer's environment includes utilities for generating information about symbolic references in the source computer program, the method further comprising the steps of
   using information from one or more files to generate one or more auxiliary files that include information on original names; and
   using the auxiliary file to compile an add-on module for execution in conjunction with the source computer program.

10. The method of claim 1, wherein the predetermined developer's environment provides for compiling the source computer program by using a linker that generates a .map file, the method further comprising
    wherein the step of using information from one or more files to generate an auxiliary file includes the substep of using the .map file to derive a .def file that is included as at least a portion of the auxiliary file.

11. A method for providing run-time modification of functionality in an executable computer program that has a substitute reference for one or more symbolic references used in a source code version of the executable computer program, the method executing on a computer system, the computer system including a processor and storage device, teh method including the steps of:
    loading the executable computer program into the computer system;
    loading a module that includes an item definition into the computer system;
    executing a process to associate the substitute reference with the item definition; and
    associating the substitute reference with the item definition during execution of the executable computer program by concurrently executing script language instructions to control the associations.

12. A computer-readable medium including instructions for converting a source computer program into an executable object having symbol references that can be redirected at run-time, the computer-readable medium including instructions for execution on a computer system, the computer system including a processor and storage device, the computer system further including a computer program having symbolic references to original definitions having original names, the computer-readable medium including:
    one or more instructions for identifying one or more of the original names;
    one or more instructions for renaming one or more original names used in the source computer program with new names;
    one or more instructions for creating an association between the original names and the new names so that symbolic references to the original names invoke a reference to the new names; and
    one or more instructions for creating executable code from the source computer program, wherein the executable code uses the associations between the original names and the new names.

13. The computer-readable medium of claim 12, further comprising one or more instructions for storing information about the associations in a table format.

14. The computer-readable medium of claim 13, further comprising one or more instructions for causing a symbolic reference to reference an entry in the table; and
    one or more instructions for associating a pointer to an original definition with the entry.

15. The computer-readable medium of claim 12, wherein a compiler is used to compile the source computer program, the computer-readable medium further comprising one or more instructions for using information generated by the compiler to perform the step of identifying original names in the source computer program.

16. The computer-readable medium of claim 12, wherein a symbolic reference is to a data structure.

17. The computer-readable medium of claim 12, wherein a symbolic reference is to a program instruction.

18. The computer-readable medium of claim 12, wherein a symbolic reference is to a resource.

19. The computer-readable medium of claim 12, wherein a symbolic reference is to an object.

20. The computer-readable medium of claim 12, wherein a predetermined developer's environment is used to compile the source computer program, wherein the predetermined developer's environment includes utilities for generating information about symbolic references in the source computer program, the computer-readable medium further comprising one or more instructions for using information from one or more files to generate one or more auxiliary files that include information on original names; and one or more instructions for using the auxiliary file to compile an add-on module for execution with the source computer program.

21. The computer-readable medium of claim 12, wherein the predetermined developer's environment provides for compiling the source computer program by using a linker that generates a .map file, the computer-readable medium further comprising one or more instructions for using the .map file to derive a .def file that is included as at least a portion of the auxiliary file.

22. A computer-readable medium including instructions for providing run-time modification of functionality in an executable computer program that has a substitute reference for one or more symbolic references used in a source code version of the executable computer program, the computer-readable medium including instructions for execution on a computer system, the computer system including a processor and storage device, the computer-readable medium including one or more instructions for loading the executable computer program into the computer system;

one or more instructions for loading a module that includes an item definition an item definition into the computer system;

one or more instructions for executing a process to associate the substitute reference with the item definition; and one or more instructions for associating the substitute reference with the item definition during execution of the executable computer program by concurrently executing script language instructions to control the associations.

23. A computer data signal embodied in a carrier wave including instructions for converting a source computer program into an executable object having symbol references that can be redirected at run-time, the computer data signal including instructions for execution on a computer system, the computer system including a processor and storage device, the computer system further including a computer program having symbolic references to original definitions having original names, the computer data signal including:

one or more instructions for identifying one or more of the original names;

one or more instructions for renaming one or more original names used in the source computer program with new names;

one or more instructions for creating an association between the original names and the new names so that symbolic references to the original names invoke a reference to the new names; and one or more instructions for creating executable code from the source computer program, wherein the executable code uses the associations between the original names and the new names.

24. The computer data signal of claim 23, further comprising one or more instructions for storing information about the associations in a table format.

25. The computer data signal of claim 24, further comprising one or more instructions for causing a symbolic reference to reference an entry in the table; and one or more instructions for associating a pointer to an original definition with the entry.

26. The computer data signal of claim 23, wherein a compiler is used to compile the source computer program, the computer data signal further comprising one or more instructions for using information generated by the compiler to perform the step of identifying original names in the source computer program.

27. The computer data signal of claim 23, wherein a symbolic reference is to a data structure.

28. The computer data signal of claim 23, wherein a symbolic reference is to a program instruction.

29. The computer data signal of claim 23, wherein a symbolic reference is to a resource.

30. The computer data signal of claim 23, wherein a symbolic reference is to a resource.

31. The computer data signal of claim 23, wherein a predetermined developer's environment is used to compile the source computer program, wherein the predetermined developer's environment includes utilities for generating information about symbolic references in the source computer program, the computer data signal further comprising one or more instructions for using information from one or more files to generate one or more auxiliary files that include information on original names; and one or more instructions for using the auxiliary file to compile an add-on module for execution in conjunction with the source computer program.

32. The computer data signal of claim 23, wherein the predetermined developer's environment provides for compiling the source computer program by using a linker that generates a .map file, the computer data signal further comprising one or more instructions for using the .map file to derive a .def file that is included as at least a portion of the auxiliary file.

33. A computer data signal embodied in a carrier wave including instructions for providing run-time modification of functionality in an executable computer program that has a substitute reference for one or more symbolic references used in a source code version of the executable computer program, the computer data signal including instructions for execution on a computer system, the computer system including a processor and storage device, the computer data signal including one or more instructions for loading the executable computer program into the computer system;

one or more instructions for loading a module that includes an item definition into the computer system;

one or more instructions for executing a process to associate the substitute reference with the item definition; and one or more instructions for associating the substitute reference with the item definition during execution of the executable computer program by concurrently executing script language instructions to control the associations.

* * * * *